US010908083B2

(12) United States Patent
Kato et al.

(10) Patent No.: US 10,908,083 B2
(45) Date of Patent: Feb. 2, 2021

(54) MULTICOLOR FLUORESCENCE ANALYSIS DEVICE

(71) Applicant: Hitachi High-Tech Corporation, Tokyo (JP)

(72) Inventors: Hirokazu Kato, Tokyo (JP); Tomohiro Shoji, Tokyo (JP); Satoshi Takahashi, Tokyo (JP); Akira Maekawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 244 days.

(21) Appl. No.: 15/545,422

(22) PCT Filed: Feb. 2, 2015

(86) PCT No.: PCT/JP2015/052852
§ 371 (c)(1),
(2) Date: Jul. 21, 2017

(87) PCT Pub. No.: WO2016/125236
PCT Pub. Date: Aug. 11, 2016

(65) Prior Publication Data
US 2018/0017492 A1    Jan. 18, 2018

(51) Int. Cl.
*G01N 21/64* (2006.01)
(52) U.S. Cl.
CPC ......... *G01N 21/64* (2013.01); *G01N 21/6454* (2013.01); *G01N 2021/6419* (2013.01);
(Continued)
(58) Field of Classification Search
None
See application file for complete search history.

(56) References Cited

U.S. PATENT DOCUMENTS

2005/0200282 A1* 9/2005 Lynn ............... H01J 9/221
                                                  313/634
2006/0132878 A1 6/2006 Curry et al.
(Continued)

FOREIGN PATENT DOCUMENTS

CA    2 249 908 A1    4/1999
JP    7-78469 B2      8/1995
(Continued)

OTHER PUBLICATIONS

International Search Report (PCT/ISA/210) issued in PCT Application No. PCT/JP2015/052852 dated Apr. 21, 2015 with English translation (Four (4) pages).
(Continued)

*Primary Examiner* — Paul S Hyun
(74) *Attorney, Agent, or Firm* — Crowell & Moring LLP

(57) ABSTRACT

A multicolor fluorescence analysis device is provided. The device includes a first fiberoptic plate for guiding light including fluorescence emitted from a sample as a result of irradiation of excitation light and emitting the same from a first emission part. The device includes a second fiberoptic plate for receiving light emitted from the first emission part at a second incidence part, guiding the same, and emitting the same from a second emission part. The device includes a single multilayer dielectric interference film filter that is provided on an end surface of the second emission part, transmits at least a portion of the fluorescence, and transmits light of a plurality of transmission wavelength bands that do not include the excitation wavelength bands. The device includes a two-dimensional detection unit that is disposed so as to be adhered to the multilayer dielectric interference film filter.

11 Claims, 19 Drawing Sheets

(52) U.S. Cl.
CPC ............ *G01N 2021/6421* (2013.01); *G01N 2021/6471* (2013.01); *G01N 2021/6484* (2013.01)

(56) References Cited

U.S. PATENT DOCUMENTS

| | | | | |
|---|---|---|---|---|
| 2007/0099208 | A1* | 5/2007 | Drmanac | C12Q 1/682 435/6.12 |
| 2007/0216069 | A1* | 9/2007 | Imai | C08J 3/248 264/408 |
| 2009/0161100 | A1* | 6/2009 | Minot | G02B 21/34 356/244 |

FOREIGN PATENT DOCUMENTS

| | | |
|---|---|---|
| JP | 2809422 B2 | 10/1998 |
| JP | 10-513553 A | 12/1998 |
| JP | 11-241947 A | 9/1999 |
| JP | 2005-77260 A | 3/2005 |
| JP | 2006-177955 A | 7/2006 |
| WO | WO 96/23213 A1 | 8/1996 |

OTHER PUBLICATIONS

Japanese-language Written Opinion (PCT/ISA/237) issued in PCT Application No. PCT/JP2015/052852 dated Apr. 21, 2015 (Three (3) pages).

* cited by examiner

Fig. 2A
Fig. 2B
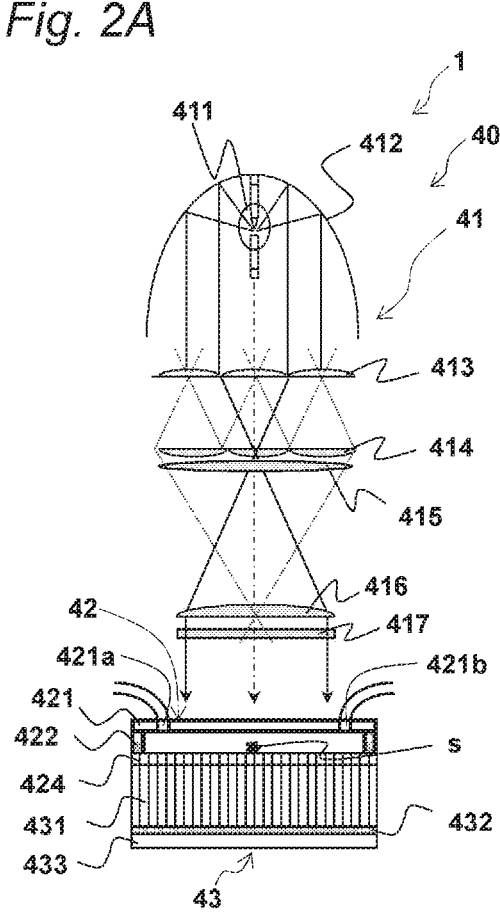
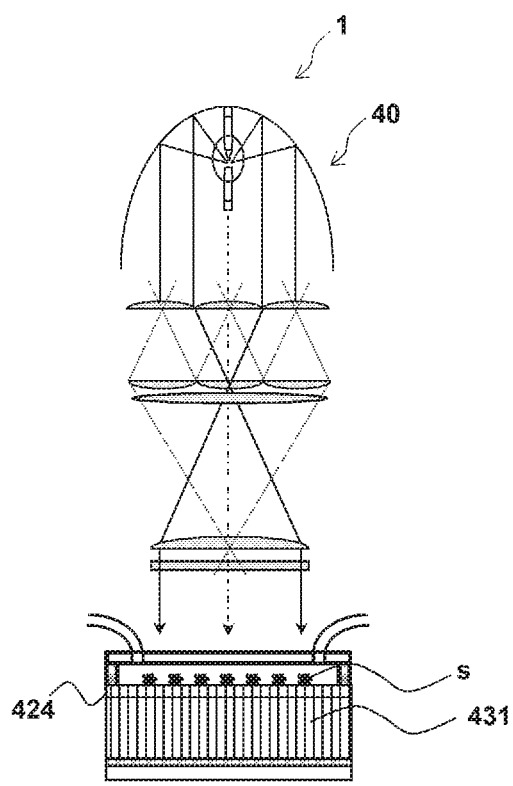

Fig. 3A
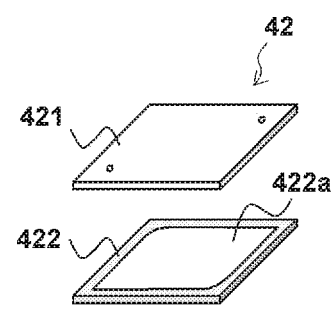
Fig. 3B
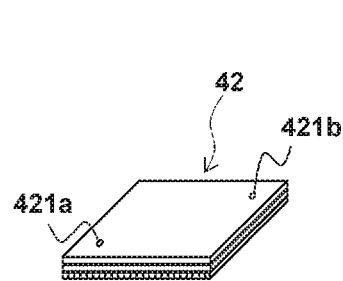
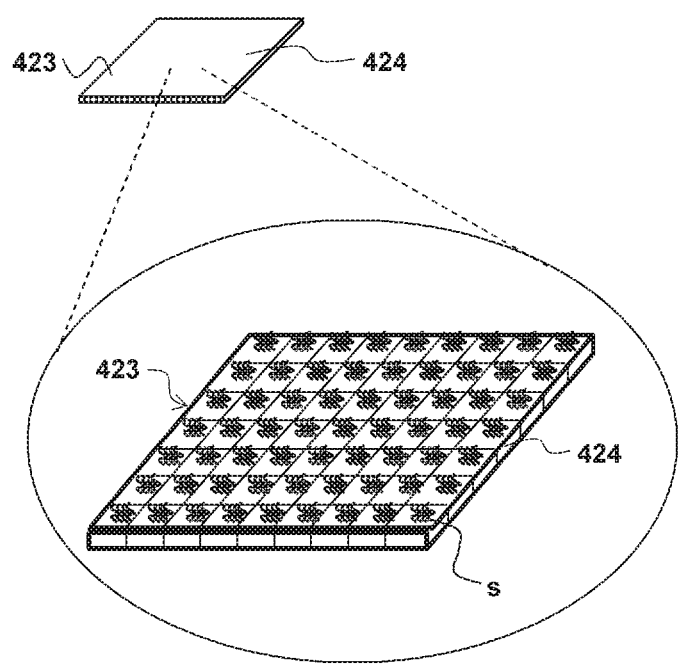

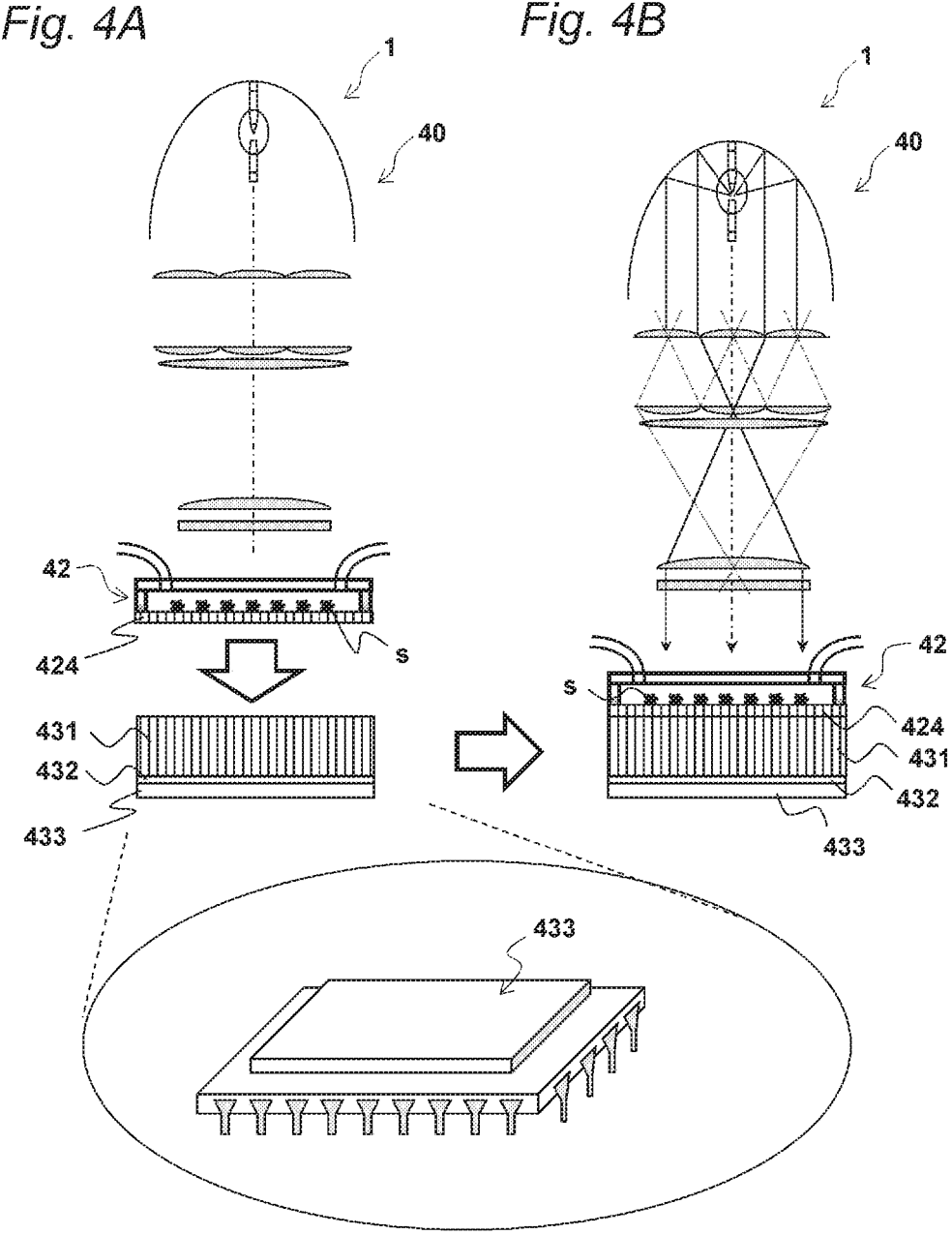

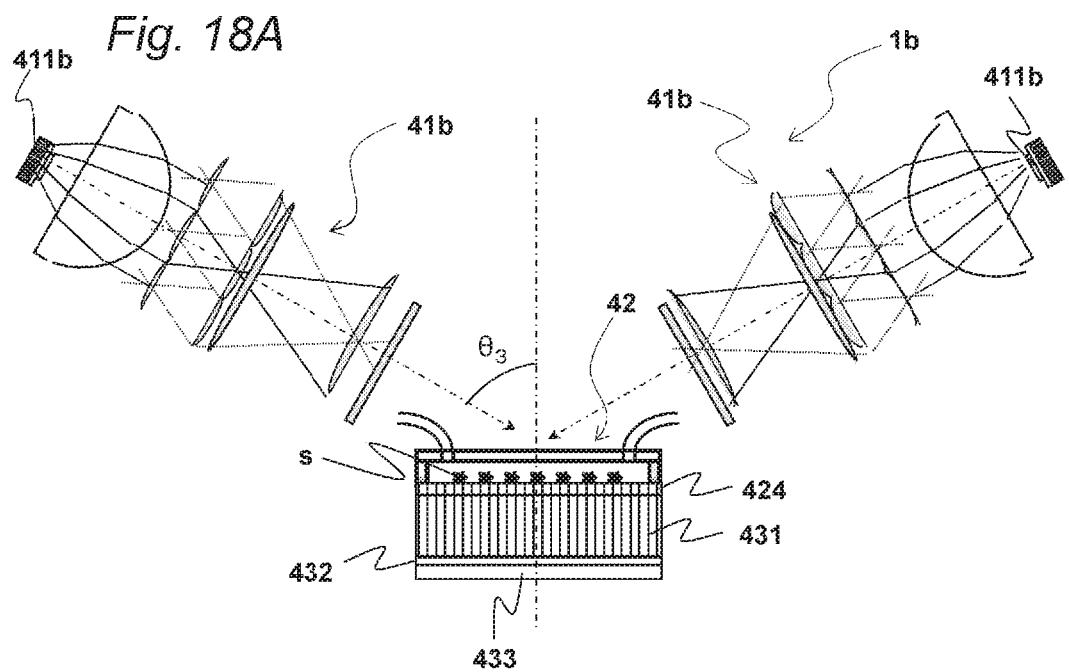
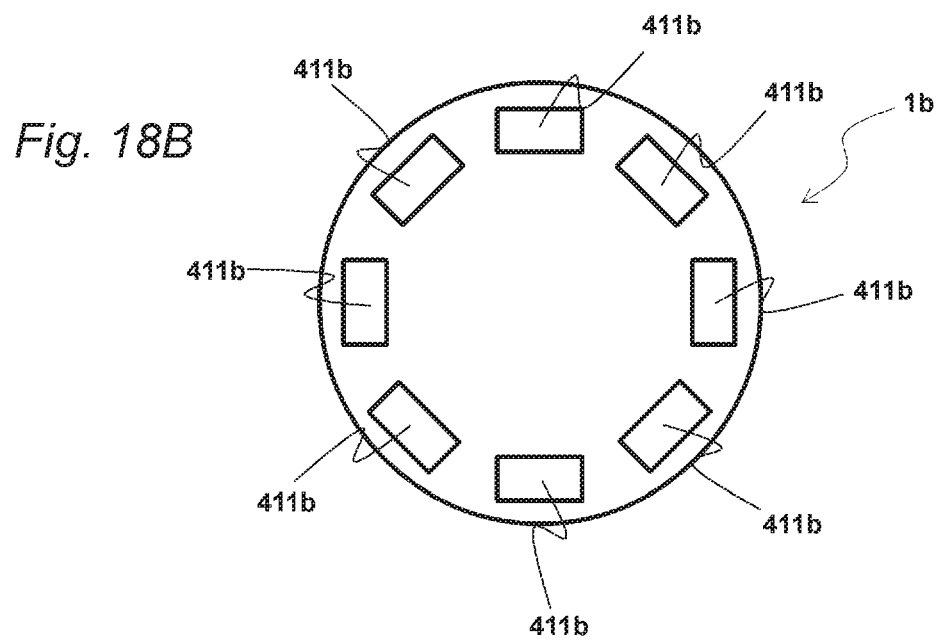

MULTICOLOR FLUORESCENCE ANALYSIS DEVICE

TECHNICAL FIELD

The present invention relates to a multicolor fluorescence analysis device.

BACKGROUND ART

For example, in a biological test, an analysis device is known in which a plurality of minute samples labelled with a fluorescent pigment are collectively irradiated with excitation light, and fluorescent light emitted from the fluorescent pigment is detected, and thus, each of the samples is specified (for example, refer to PTL 1).

In the analysis device, a replaceable interference filter for taking out only fluorescent light having a specific wavelength by separating the excitation light is provided, the fluorescent light transmitted through the interference filter is guided by a plurality of optical fibers which are arranged to correspond to each of the samples, and analysis is performed by using an image sensor attached to the other end of the optical fiber.

In such an analysis device, a fiber optic plate in which a plurality of optical fibers are bundled is used as a section for guiding the fluorescent light, the fluorescent light transmitted by the bundled optical fibers is collectively processed as a two-dimensional image by the image sensor, and the presence or absence of the fluorescent light is determined, and thus, it is possible to simultaneously perform fluorescence analysis with respect to the plurality of samples.

CITATION LIST

Patent Literature

PTL 1: JP 11-241947 A

SUMMARY OF INVENTION

Technical Problem

However, for example, in the case of analyzing a sample containing a plurality of fluorescent pigments having different fluorescence wavelengths as represented by base sequence analysis of a DNA using a sequence by synthesis (hereinafter, also referred to as "SBS") method, in the analysis device of the related art as described above, it is necessary to replace the interference filter for each of the fluorescent pigments as an analysis target, and vast amounts of hours are required for the analysis in a case where the interference filter is replaced for each base extension reaction to be repeated, and thus, it is not possible to satisfy a demand for speed up of the analysis.

The present invention has been made in consideration of the circumstances described above, and an object of the present invention is to provide a multicolor fluorescence analysis device in which it is possible to collectively and accurately detect fluorescent light emitted from a plurality of types of fluorescent pigments contained in a sample.

Solution to Problem

The present invention relates to
(1) a multicolor fluorescence analysis device detecting fluorescent light which is emitted from a plurality of types of fluorescent pigments having different fluorescence wavelengths contained in a sample by being irradiated with excitation light, the device including:

an irradiation unit which irradiates the sample with excitation light having a plurality of excitation wavelength bands different from each other;

a first fiber optic plate which is in contact with at least a part of the sample, receives light including the fluorescent light emitted from the sample by being irradiated with the excitation light from a first incident portion and guides the light, and allows the light to exit from a first exiting portion on a side opposite to the first incident portion;

a second fiber optic plate which receives the light exiting from the first exiting portion from a second incident portion and guides the light, and allows the light to exit from a second exiting portion on a side opposite to the second incident portion;

a single dielectric multilayer film interference filter which is disposed on an end surface of the second exiting portion, and transmits at least a part of the fluorescent light and transmits light having a plurality of transmission wavelength bands not including the excitation wavelength band; and a two-dimensional detection unit which is disposed to be closely attached to the dielectric multilayer film interference filter, and detects light transmitted through the dielectric multilayer film interference filter, (2) the multicolor fluorescence analysis device according to (1), wherein the dielectric multilayer film interference filter is a first dielectric multilayer film interference filter, and the irradiation unit includes a light source and a second dielectric multilayer film interference filter which selectively transmits excitation light having a predetermined excitation wavelength band from light emitted from the light source, (3) the multicolor fluorescence analysis device according to (2), wherein a rising wavelength ($\lambda_{1i}$) satisfying a relationship in which a transmittance ($\alpha_1$) of light in a transmission wavelength band of the first dielectric multilayer film interference filter is less than a predetermined value ($\alpha$), and a falling wavelength ($\lambda_{2j}$) satisfying a relationship in which a transmittance ($\alpha_2$) of light in a transmission wavelength band of the second dielectric multilayer film interference filter is less than the predetermined value ($\alpha$) satisfy a relationship represented by Expression (1) described below,

[Expression 1]

$$\lambda_{2j} \leq \lambda_{1i}\sqrt{1-(\sin\theta_{max}/n_{\text{eff}})^2} \qquad (1)$$

in Expression (1), i and k are respectively integers greater than or equal to 1, $\theta_{max}$ is a maximum incident angle of light incident on the first dielectric multilayer film interference filter, and $n_{\text{eff}}$ is an effective refractive index of the first dielectric multilayer film interference filter, (4) the multicolor fluorescence analysis device according to (3), wherein the predetermined value ($\alpha$) is 0.1%, (5) the multicolor fluorescence analysis device according to (3) or (4), wherein the effective refractive index ($n_{\text{eff}}$) of the first dielectric multilayer film interference filter is greater than or equal to 1.5 and less than or equal to 2.2, (6) the multicolor fluorescence analysis device according to any one of (3) to (5), wherein the maximum incident angle ($\theta_{max}$) of the light incident on the first dielectric multilayer film interference filter is 30°, (7) the multicolor fluorescence analysis device according to any one of (1) to (6), wherein an outer diameter of an optical fiber configuring the second fiber optic plate is less than an outer diameter of an optical fiber configuring the first fiber optic plate, (8) the multicolor fluorescence analysis device according to any one of (3) to (7), wherein the excitation light in each excitation wavelength band is sequentially emitted, (9) the multicolor fluorescence analysis device according to any one of (3) to (7), wherein excitation light having at least two excitation wavelength bands are simultaneously emitted,

(10) the multicolor fluorescence analysis device according to any one of (1) to (7), wherein the sample is a DNA segment containing a fluorescent pigment, and the multicolor fluorescence analysis device is used for analyzing a base sequence of the DNA segment,

(11) the multicolor fluorescence analysis device according to (10), wherein the fluorescent pigment is Alexa405, FAM, Texas Red, and Cy5.5,

(12) the multicolor fluorescence analysis device according to (11), wherein the second dielectric multilayer film interference filter includes a first filter, a second filter, a third filter, and a fourth filter, a transmittance of the first filter is greater than or equal to 85% in a wavelength band of 380 nm to 396 nm, and is less than 0.1% in a wavelength band other than the wavelength band of 380 nm to 396 nm, a transmittance of the second filter is greater than or equal to 85% in a wavelength band of 474 nm to 497 nm, and is less than 0.1% in a wavelength band other than the wavelength band of 474 nm to 497 nm, a transmittance of the third filter is greater than or equal to 85% in a wavelength band of 561 nm to 575 nm, and is less than 0.1% in a wavelength band other than the wavelength band of 561 nm to 575 nm, a transmittance of the fourth filter is greater than or equal to 85% in a wavelength band of 641 nm to 657 nm, and is less than 0.1% in a wavelength band other than the wavelength band of 641 nm to 657 nm, and the first filter, the second filter, the third filter, and the fourth filter are used by being switched,

(13) the multicolor fluorescence analysis device according to (11), wherein the second dielectric multilayer film interference filter is a single filter, a transmittance of the second dielectric multilayer film interference filter is greater than or equal to 85% in the wavelength bands of 380 nm to 396 nm, 474 nm to 497 nm, 561 nm to 575 nm, and 641 nm to 657 nm, and is less than 0.1% in a wavelength band other than the aforementioned wavelength bands,

(14) the multicolor fluorescence analysis device according to (12) or (13), wherein a transmittance of the first dielectric multilayer film interference filter is greater than or equal to 85% in wavelength bands of 436 nm to 462 nm, 536 nm to 548 nm, 620 nm to 632 nm, and 713 nm to 800 nm, and is less than 0.1% in a wavelength band other than the aforementioned wavelength bands, and

(15) the multicolor fluorescence analysis device according to anyone of (10) to (14), wherein an end surface of a core portion of the optical fiber is subjected to an aminosilane treatment, and a surface other than the end surface of the core portion of the optical fiber is subjected to an HMDS treatment, on a surface of the first fiber optic plate on a side which is in contact with the sample.

Furthermore, herein, in a fiber optic plate (hereinafter, also referred to as "FOP"), a plurality of optical fibers are integrally bundled, and both end portions in an axis direction of the optical fiber have a planar shape, and the fiber optic plate indicates a device in which light incident from one end of the optical fiber can be guided to the other end of the optical fiber. The fiber optic plate is a concept including a fiber optic taper (hereinafter, also referred to as a "FOT").

Advantageous Effects of Invention

In the present invention, it is possible to provide a multicolor fluorescence analysis device in which it is possible to collectively and accurately detect fluorescent light emitted from a plurality of types of fluorescent pigments contained in a sample. Therefore, the multicolor fluorescence analysis device, for example, is capable of being suitably used for base sequence analysis of a DNA or the like by the SBS method in which a plurality of fluorescent pigments are simultaneously used.

BRIEF DESCRIPTION OF DRAWINGS

FIGS. 2A and 2B are schematic views illustrating a fluorescence detection section of the multicolor fluorescence analysis device of FIG. 1, FIG. 2A illustrates a state in which there is one sample, and FIG. 2B illustrates a state where there are a plurality of samples.

FIGS. 3A and 3B are schematic perspective views of flow chips of FIGS. 2A and 2B, FIG. 3A illustrates a disassembled state, and FIG. 3B illustrates an assembled state.

FIGS. 4A and 4B are schematic views illustrating fluorescence detection sections of FIGS. 2A and 2B, FIG. 4A illustrates a state before the flow chip is mounted, and FIG. 4B illustrates a state in which the flow chip is mounted.

FIG. 5A illustrates a propagation state in a first fiber optic plate and a second fiber optic plate, and FIG. 5B illustrates a propagation state in a first optical fiber and a second optical fiber.

FIG. 6A illustrates a state in which the incident angle is 0°, FIG. 6B illustrates a state in which the incident angle is changed, FIG. 6C illustrates a state in which the incident angle is 30°, and FIG. 6D illustrates a state in which the incident angle is 0° and a short wavelength shift is considered.

FIG. 8A illustrates a transmittance of a first filter, FIG. 8B illustrates a transmittance of a second filter, FIG. 8C illustrates a transmittance of a third filter, FIG. 8D illustrates a transmittance of a fourth filter, and FIG. 8E illustrates a transmittance of a first dielectric multilayer film interference filter.

9, FIG. 10A illustrates characteristics in which a short wavelength shift is not considered in a first dielectric multilayer film interference filter and a second dielectric multilayer film interference filter, FIG. 10B illustrates characteristics in which the short wavelength shift is considered in the first dielectric multilayer film interference filter and the second dielectric multilayer film interference filter, and FIG. 10C illustrates a fluorescence spectrum of each fluorescent pigment.

FIG. 11A illustrates a fluorescence spectrum transmitted through the first dielectric multilayer film interference filter, and FIG. 11B illustrates wavelength characteristics of each sensor in the two-dimensional detection units.

FIG. 13A illustrates a fluorescence spectrum transmitted through the first dielectric multilayer film interference filter, and FIG. 13B illustrates wavelength characteristics of each sensor in the two-dimensional detection units.

FIG. 17A illustrates a front view, and FIG. 17B illustrates a plan view.

FIGS. 18A and 18B are schematic views illustrating an aspect in which an oblique illumination is used as the irradiation unit of the fluorescence detection section of FIG. 15.

FIG. 19A illustrates a sectional view of the first fiber optic plate and the second fiber optic plate, and FIG. 19B illustrates a sectional perspective view of the first optical fiber and the second optical fiber.

DESCRIPTION OF EMBODIMENTS

Figure 1:
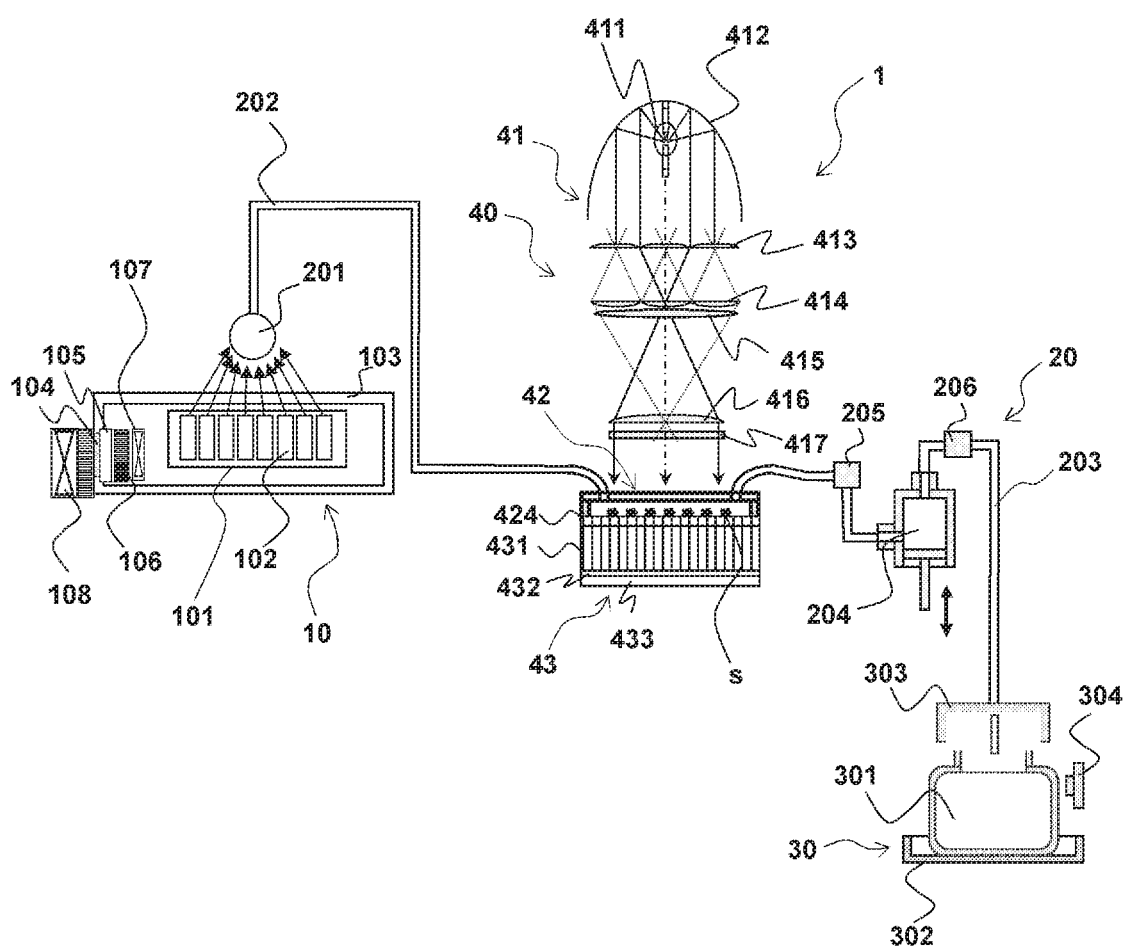
FIG. 1 is a schematic view illustrating an embodiment of a multicolor fluorescence analysis device of the present invention.

A multicolor fluorescence analysis device of the present invention detecting fluorescent light which is emitted from a plurality of types of fluorescent pigments having different fluorescence wavelengths of a sample by being irradiated with excitation light includes: an irradiation unit which irradiates the sample with excitation light having a plurality of excitation wavelength bands different from each other; a first fiber optic plate which is in contact with at least a part of the sample, receives light including the fluorescent light emitted from the sample by being irradiated with the excitation light from a first incident portion and guides the light, and allows the light to exit from a first exiting portion on a side opposite to the first incident portion; a second fiber optic plate which receives the light exiting from the first exiting portion from a second incident portion and guides the light, and allows the light to exit from a second exiting portion on a side opposite to the second incident portion; a single dielectric multilayer film interference filter which is disposed on an end surface of the second exiting portion, and transmits at least apart of the fluorescent light and transmits light having a plurality of transmission wavelength bands not including the excitation wavelength band; and a two-dimensional detection unit which is disposed to be closely attached to the dielectric multilayer film interference filter, and detects light transmitted through the dielectric multilayer film interference filter.

Thus, the multicolor fluorescence analysis device includes the irradiation unit, the first fiber optic plate and the second fiber optic plate, the dielectric multilayer film interference filter, and the two-dimensional detection unit, and thus, it is possible to collectively and accurately detect fluorescent light emitted from the plurality of fluorescent pigments contained in the sample. As described below, it is assumed that it is because an overlap between the wavelength band of the excitation light and the wavelength band of the fluorescent light used for detection can be suppressed, and as a result thereof, only the fluorescent light can be dispersed, and analysis accuracy can be improved.

The multicolor fluorescence analysis device of the present invention is used as an analysis device detecting the fluorescent light emitted from the plurality of types of fluorescent pigments having different fluorescence wavelengths contained in the sample as described above, and the sample, which is an analysis target thereof, is not particularly limited insofar as the conditions are satisfied, but it is preferable that the sample is a DNA segment containing a fluorescent pigment, and the multicolor fluorescence analysis device is used for analyzing abase sequence of the DNA segment. Accordingly, it is possible to rapidly and accurately recognize four types of nucleotides (dATP, dCTP, dGTP, and dTTP) labelled with a fluorescent pigment, and to efficiently decode the base sequence of a DNA.

Hereinafter, the multicolor fluorescence analysis device of the present invention will be described on the basis of the drawings, but the present invention is not limited only to embodiments described in the drawings. Furthermore, in the following embodiments, the sample is the DNA segment containing the fluorescent pigment, and the multicolor fluorescence analysis device which is used for analyzing the base sequence of the DNA segment using an SBS reaction manner (hereinafter, also referred to as a "DNA sequencer") will be described as an example. In addition, in the following embodiments, the first fiber optic plate is used as a substrate of a flow chip. In addition, in the following embodiments, the single dielectric multilayer film interference filter disposed on the end surface of the second exiting portion will be referred to as a first dielectric multilayer film interference filter.

FIG. 1 is a schematic view illustrating an embodiment of the multicolor fluorescence analysis device of the present invention. As illustrated in FIG. 1, a multicolor fluorescence analysis device 1 is schematically configured of a reagent storage section 10, a liquid feeding section 20, a waste liquid storage section 30, and a fluorescence detection section 40.

The reagent storage section 10 is a section storing a reagent and the like used in the DNA sequencer. The reagent storage section 10 includes a reagent cartridge 101, and a plurality of reagent storage containers 102 separately storing a primer reagent, a polymerase enzyme, an extension reagent including four types of nucleotides containing fluorescent pigments, a protecting group cleaving reagent, a washing reagent, an imaging reagent, and the like are contained in the reagent cartridge 101.

The liquid feeding section 20 is a section which supplies the reagent or the like into a flow chip 42 described below and feeds the reagent or the like discharged from the flow chip 42 to the waste liquid storage section 30 described below. The liquid feeding section 20 includes a switching valve 201 which selectively switches the reagent or the like supplied to the flow chip 42 from the plurality of reagent storage containers 102, a flow path 202 which feeds the reagent or the like to the flow chip 42, and a flow path 203 which feeds the reagent or the like discharged from the flow chip 42 to the waste liquid storage section 30. In addition, a syringe 204 and two two-way valves 205 and 206 are disposed on the flow path 203, and the supply of the reagent or the like to the flow chip 42 and the discharge of the reagent or the like from the flow chip 42 are performed by using the syringe 204 and the two-way valves 205 and 206.

The waste liquid storage section 30 is a section which stores a waste liquid of the reagent or the like discharged from the flow chip 42. Specifically, the waste liquid storage section 30 is configured of a waste liquid tank 301 which receives a waste liquid discharged from an end portion of the flow path 203 of the liquid feeding section 20, a liquid receiving tray 302 which is a tray in a case where the waste liquid is leaked from the waste liquid tank 301, a lid 303 which prevents the evaporation of the waste liquid, and a microphotosensor 304 which monitors the presence or absence of the waste liquid tank 301.

The fluorescence detection section 40 includes an irradiation unit 41, the flow chip 42, and a fluorescence detection unit 43.

The irradiation unit 41 irradiates a sample s with excitation light having a plurality of excitation wavelength bands different from each other. As illustrated in FIG. 2(a), the irradiation unit 41 includes a light source 411, a parabolic mirror 412, a first fly eye lens 413, a second fly eye lens 414, a compound lens 415, a field lens 416, and a second dielectric multilayer film interference filter 417.

The light source 411 is a light source for excitation. The light source 411 emits light which is used for generating excitation light. In general, a xenon short arc lamp is adopted as the light source 411. The xenon short arc lamp is discharged in xenon gas, and has an excellent continuous spectrum in a visible light range, and thus, is a preferred electric-discharge lamp as a light source for generating light having a plurality of excitation wavelength bands.

The parabolic mirror 412 reflects the light emitted from the light source 411 and converts the light into parallel light. The first fly eye lens 413, the second fly eye lens 414, the compound lens 415, and the field lens 416 convert the parallel light which is converted by the parabolic mirror 412 into parallel light having uniformity in corporation with each other. Here, the compound lens 415 uniformizes illuminance by allowing images of each lens cell of the first fly eye lens 413 to overlap each other on the field lens 416, and by allowing illuminance distributions of each of the lens cells of the first fly eye lens 413 to overlap each other.

The second dielectric multilayer film interference filter 417 selectively transmits excitation light having a predetermined excitation wavelength band from the light emitted from the light source 411. Specifically, the second dielectric multilayer film interference filter 417 is configured of a glass substrate (not illustrated) which is transparent with respect to visible light, and a dielectric multilayer film(not illustrated) which is formed on the glass substrate.

Examples of a material configuring the dielectric multilayer film include $SiO_2$, $TiO_2$, $Ta_2O_5$, $Nb_2O_5$, and the like. The dielectric multilayer film is formed by selecting a high index material and a low index material from the materials shown above, and by alternately laminating the high index material and the low index material by approximately 10 layers to 40 layers. A film thickness or the like of each layer is suitably determined on the basis of a desired wavelength band in which light is transmitted through the dielectric multilayer film interference filter 417. In general, the total thickness of the dielectric multilayer film is approximately 10 μm. A vacuum deposition method, an ion assisted method, an ion plating method, a sputtering method, and an ion assisted ion beam sputtering method are preferable, and the vacuum deposition method is more preferable, as a formation method of the dielectric multilayer film. According to the formation method, it is possible to impart excellent optical properties such as excellent stability to temperature or humidity and precipitous rising properties.

Thus, using the second dielectric multilayer film interference filter 417, for example, it is possible to distinct a wavelength range of an excitation wavelength band more clearly compared to a pigment filter which has been used in the related art, and to improve fluorescence detection accuracy in the two-dimensional detection unit by reliably shielding the excitation light with the first dielectric multilayer film interference filter described below.

Figure 7:
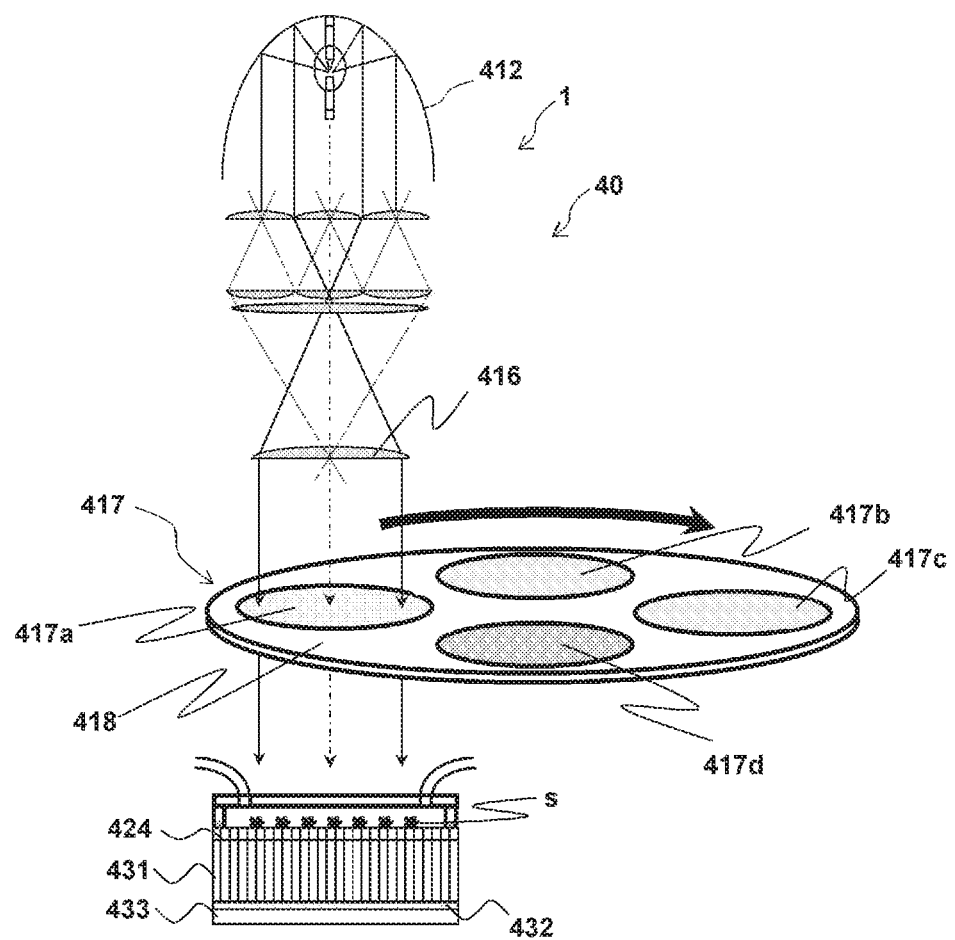
FIG. 7 is a schematic view specifically illustrating one aspect of irradiation units in the fluorescence detection sections of FIGS. 2A and 2B.

In the multicolor fluorescence analysis device 1, the sample s is sequentially irradiated with the excitation light having each of the excitation wavelength bands by using the second dielectric multilayer film interference filter 417 described above. Specifically, as illustrated in FIG. 7, the second dielectric multilayer film interference filter 417 includes a first filter 417a, a second filter 417b, a third filter 417c, and a fourth filter 417d, the first to fourth filters 417a to 417d are used by being sequentially switched, and light having a predetermined excitation wavelength band is selectively transmitted, and thus, it is possible to irradiate the sample s with the transmitted light as the excitation light. The first to fourth filters 417a to 417d are attached to a filter wheel 418 configuring the second dielectric multilayer film interference filter 417, and the filter wheel 418 is rotated at a high speed (for example, a high speed to the extent of being moved to a different filter within 50 ms) by using a driving device (not illustrated). Thus, the excitation light having each of the excitation wavelength bands is sequentially emitted, and thus, it is possible to reliably recognize the fluorescent light emitted from each of the fluorescent pigments.

In the analysis of the base sequence of this embodiment, the fluorescent pigments to be suitably used are four types of pigments of Alexa405, FAM, Texas Red, and Cy5.5. Alexa405 is bonded to dCTP, FAM is bonded to dATP, Texas Red is bonded to dGTP, and Cy5.5 is bonded to dTTP. For this reason, the excitation light which is capable of exciting the fluorescent pigment is irradiated, and thus, the corresponding fluorescent light is emitted from the nucleotide to which the fluorescent pigment is bonded (hereinafter, also referred to as "fluorescent nucleotide"), and a base is decoded by detecting the fluorescent light. Thus, the fluorescent pigment is the pigment described above, and thus, it is possible to reliably recognize four types of nucleotides, and to accurately specify the base in the corresponding DNA segment.

Figure 8A:
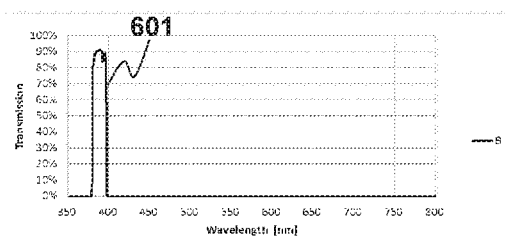
FIGS. 8A to 8E are schematic transmission characteristic diagrams of each filter in the irradiation unit of fluorescence detection section of FIG. 7.
Figure 8B:
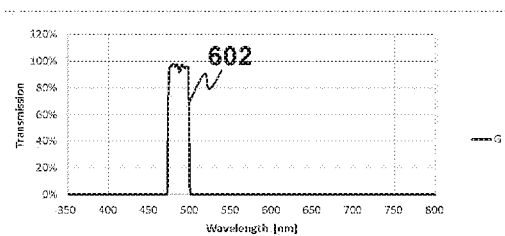
Figure 8C:
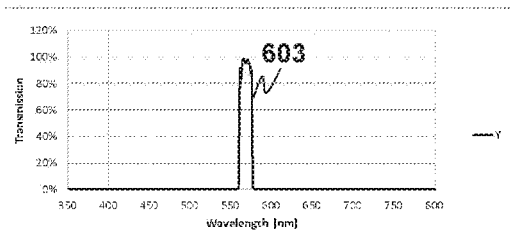
Figure 8D:
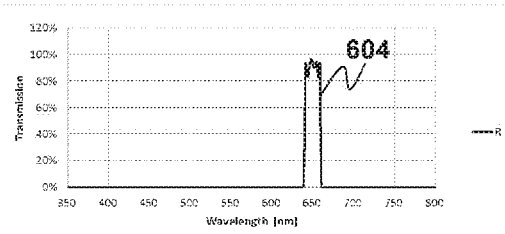
Figure 8E:
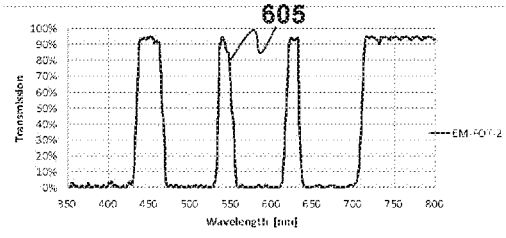

In order to excite four types of fluorescent pigments described above, the transmittance of the first filter 417a is greater than or equal to 85% in a wavelength band of 380 nm to 396 nm and is less than 0.1% in a wavelength band other than the wavelength band of 380 nm to 396 nm, the transmittance of the second filter 417b is greater than or equal to 85% in a wavelength band of 474 nm to 497 nm and is less than 0.1% in a wavelength band other than the wavelength band of 474 nm to 497 nm, the transmittance of the third filter 417c is greater than or equal to 85% in a wavelength band of 561 nm to 575 nm and is less than 0.1% in a wavelength band other than the wavelength band of 561 nm to 575 nm, and the transmittance of the fourth filter 417d is greater than or equal to 85% in a wavelength band of 641 nm to 657 nm and is less than 0.1% in a wavelength band other than the wavelength band of 641 nm to 657 nm. As a result thereof, a suitable filter is selected from the first to fourth filters 417a to 417d, and thus, it is possible to suitably obtain the excitation light in each of the excitation wavelength bands of 380 nm to 396 nm (Alexa405 is mainly excited), 474 nm to 497 nm (FAM is mainly excited), 561 nm to 575 nm (Texas Red is mainly excited), and 641 nm to 657 nm (Cy5.5 is mainly excited). Furthermore, in FIGS. 8(a) to 8(d), reference numerals of 601 and 604 respectively represent transmission wavelength bands of the first to fourth filters 417a to 417d. In addition, FIG. 8(e) illustrates a transmission wavelength band 605 of a first dielectric multilayer film interference filter 432 (described below) in the case of using the first to fourth filters 417a to 417d described above. Thus, the second dielectric multilayer film interference filter 417 includes the first to fourth filters 417a to 417d, and the transmittance of each of the filters satisfies the conditions described above, and thus, it is possible to efficiently excite and detect four types of fluorescent pigments described above.

Furthermore, it is also preferable that excitation light having at least two excitation wavelength bands is simultaneously emitted. Accordingly, it is possible to simultaneously and efficiently excite a plurality of fluorescent pigments corresponding to the excitation wavelength band described above, and to rapidly perform the fluorescence analysis. Specifically, in a case where the fluorescent pigment to be used is Alexa405, FAM, Texas Red, and Cy5.5, the second dielectric multilayer film interference filter 417 is a single filter, as illustrated by a reference numeral of 701 in FIGS. 10(a) and 10(b), it is preferable that the transmittance of the second dielectric multilayer film interference filter 417 is greater than or equal to 85% in the wavelength bands of 380 nm to 396 nm, 474 nm to 497 nm, 561 nm to 575 nm, and 641 nm to 657 nm and is less than 0.1% in a wavelength band other than the wavelength bands described above. Thus, the second dielectric multilayer film interference filter 417 is a single filter, and the second dielectric multilayer film interference filter 417 transmits the light having the plurality of wavelength bands described above, and thus, it is possible to simultaneously and more efficiently excite four types of fluorescent pigments described above, and to more rapidly perform the fluorescence analysis.

FIGS. 3(a) and 3(b) are schematic perspective views of the flow chips of FIGS. 2(a) and 2(b). As illustrated in FIGS. 3(a) and 3(b), the flow chip 42 includes a cover glass 421, a spacer 422, and a substrate 423.

The cover glass 421 has light transmittance, and in particular, transmits visible light having a wavelength of greater than or equal to 400 nm and less than or equal to 800 nm. Examples of the material of the cover glass 421 include glass, quartz, sapphire, and the like. The cover glass 421 includes an inlet 421a for injecting a liquid such as a reagent into the flow path in the flow chip 42 and an outlet 421b for discharging the used liquid.

In the spacer 422, a punched hole 422a is formed leaving a frame-like circumferential portion. The spacer 422 is interposed between the cover glass 421 and the substrate 423 described below, taken together forming the flow path for supplying the liquid described above to the sample s. In general, the spacer 422 is formed by using polydimethyl siloxane (PDMS). The thickness of the spacer 422 is generally 30 μm to 100 μm, is preferably 40 μm to 60 μm, and is more preferably 45 μm to 55 μm, from the viewpoint of smoothly circulating the liquid such as the reagent.

Figure 5A:
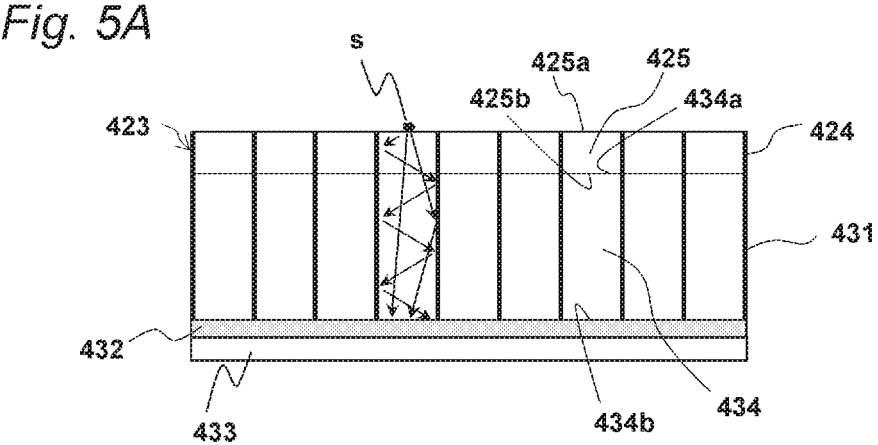
FIGS. 5A and 5B are schematic views illustrating a propagation state of fluorescent light in the fluorescence detection sections of FIGS. 2A and 2B.

The substrate 423 fixes the DNA segment which is the sample s. The substrate 423 is configured of a first fiber optic plate 424. As illustrated in FIG. 5(a), the first fiber optic plate 424 is in contact with at least a part of the sample s, receives the light including the fluorescent light which is emitted from the sample s by being irradiated with the excitation light from a first incident portion 425a and guides the light, and allows the light described above to exit from a first exiting portion 425b on a side opposite to the first incident portion 425a.

Figure 5B:
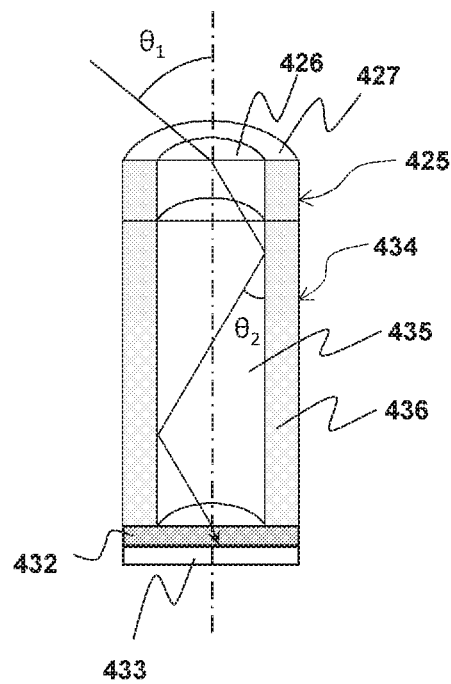

The first fiber optic plate 424 is configured of a plurality of optical fibers (hereinafter, also referred to as a "first optical fiber 425") which guide light and are arranged into the shape of a grid, and absorber glass (not illustrated) which covers the first optical fiber 425 and absorbs light leaked from the first optical fiber 425. As illustrated in FIG. 5(b), the first optical fiber 425 is configured of a core portion 426, and a clad portion 427 covering the core portion 426. The core portion 426 and the clad portion 427 are respectively formed of core glass and clad glass, and both of the glasses have different refractive indices. For this reason, the refractive index of the glass configuring the core portion 426 and the clad portion 427 is suitably selected, and thus, it is possible to allow total reflection to occur on an interface between the core portion 426 and the clad portion 427, and to guide the light received from the first incident portion 425a to the first exiting portion 425b by guiding the light in an optical axis direction of the first optical fiber 425 (refer to FIG. 5(a)).

In addition, in each of the optical fibers 425, an end surface of the core portion 426 of the first optical fiber 425 is subjected to an aminosilane treatment, and a surface other than the end surface of the core portion 426 of the first optical fiber 425 is subjected to a hexamethyl disilazane treatment (an HMDS treatment), on the surface of the first fiber optic plate 424 on a side which is in contact with the sample s. As described above, the aminosilane treatment and the HMDS treatment are performed, and thus, the DNA segment can be rigidly adsorbed on a film formed of aminosilane which is formed on the end surface of the core portion 426 of the first optical fiber 425 (hereinafter, a region where a film formed of aminosilane is formed will also be referred to as a "spot portion"), the adsorption of the DNA segment with respect to a film formed of 1,1,1,3,3,3-hexamethyl disilazane which is formed on the surface other than the end surface of the core portion 426 of the first optical fiber 425 can be suppressed, and the DNA segment can be selectively fixed onto the end surface of the core portion 426. As a result thereof, it is possible to reliably take in the fluorescent light emitted from the DNA segment through the end surface of the core portion 426. Furthermore, for example, a method described in the specification of US Patent Publication No. 2009/0270273 can be applied as a formation method of the spot portion described above and a region other than the spot portion.

In this embodiment, the diameter of the first optical fiber 425 (an outer diameter of the clad portion 427) is approximately 1.4 μm, the diameter of the spot portion described above is approximately 0.3 μm. For this reason, the DNA segment, which is the sample s, has a suitable size, and thus, it is possible to dispose one DNA segment on the end surface of the core portion 426 of one first optical fiber 425, and to allow one DNA segment(the sample s) to correspond to one first optical fiber 425.

The refractive indices of the core glass and the clad glass used in this embodiment are respectively 1.80 and 1.67. For this reason, in general, a numerical aperture, which is the index of light condensing capability of a single fiber, can be calculated as 0.67 by using Expression (2) described below.

[Expression 2]

$$NA = \sqrt{e,rad} (n_2^2 - n_3^2) \quad (2)$$

In Expression (2) described above, NA is the numerical aperture. $n_2$ and $n_3$ are respectively the refractive indices of the core glass and the clad glass.

Here, a refractive index ($n_1$) of an aqueous solution of the reagent or the like used in this embodiment is 1.33. For this reason, the maximum incident angle of light in the first incident portion 425a is calculated as 30° by using Expression (3) described below. Furthermore, in Expression (3) described below, $\theta_{max}$ is the maximum incident angle. NA is identical to that in Expression (2) described above.

[Expression 3]

$$\theta_{max} = \text{Arc} \sin(NA/n_1) \quad (3)$$

Therefore, in this embodiment, in order to allow the light incident on the first optical fiber 425 to reach the first exiting portion 425b by being guided while being subjected to total reflection, it is necessary that an incident angle ($\theta_1$) in the first incident portion 425a (refer to FIG. 5(b)) satisfies conditions of $\theta_1 \leq 30°$. On the other hand, a light ray of which the incident angle ($\theta_1$) in the first incident portion 425a is $\theta_1 > 30°$ is greater than 30°, which is the maximum incident angle ($\theta_{max}$) and thus, it is not possible to allow the total reflection to occur on the interface between the core portion 426 and the clad portion 427, the light ray passes through the clad portion 427 and is absorbed on the absorber glass, and therefore, it is not possible to allow the light ray to reach the first exiting portion 425b.

As illustrated in FIG. 2(a), the fluorescence detection unit 43 includes a second fiber optic plate 431, a first dielectric multilayer film interference filter 432, and a two-dimensional detection unit 433.

The second fiber optic plate 431 receives the light exiting from the first exiting portion 425b from a second incident portion 434a and guides the light, and allows the light from the second exiting portion 434b on a side opposite to the second incident portion 434a (refer to FIG. 5(a)). As with the first fiber optic plate 424, the second fiber optic plate 431 is configured of an optical fiber formed of a core portion 435 and a clad portion 436 (hereinafter, also referred to as a "second optical fiber 434"), and absorber glass (not illustrated). In addition, as illustrated in FIG. 5(a), outer diameters of the first and second optical fibers 425 and 434 are identical to each other, optical axes of the first and second optical fibers 425 and 434 are coincident with each other, and the first exiting portion 425b is disposed to be in contact with or to be close to the second incident portion 434a. Here, being close indicates a state where the first exiting portion 425b is separated from the second incident portion 434a in a range where the light exiting from the first exiting portion 425b is received in the second incident portion 434a without being leaked. Furthermore, the second fiber optic plate 431 is a pedestal for placing the flow chip 42.

Furthermore, in this embodiment, as described above, the outer diameters of the first and second optical fibers 425 and 434 are identical to each other, but it is also preferable that the outer diameter of the optical fiber configuring the second fiber optic plate 431 (the second optical fiber 434) is less than the outer diameter of the optical fiber configuring the first fiber optic plate 424 (the first optical fiber 425). Accordingly, it is possible to prevent light exiting from a plurality of adjacent first optical fibers 425 from being incident on a single second optical fiber 434, and to improve space resolution in the fluorescence detection.

Figure 19A:
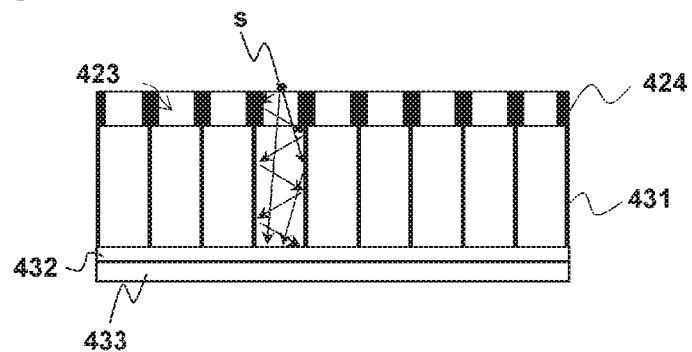
FIGS. 19A and 19B are schematic views illustrating another aspect of the first fiber optic plate and the second fiber optic plate in the fluorescence detection sections of FIGS. 2A and 2B.
Figure 19B:
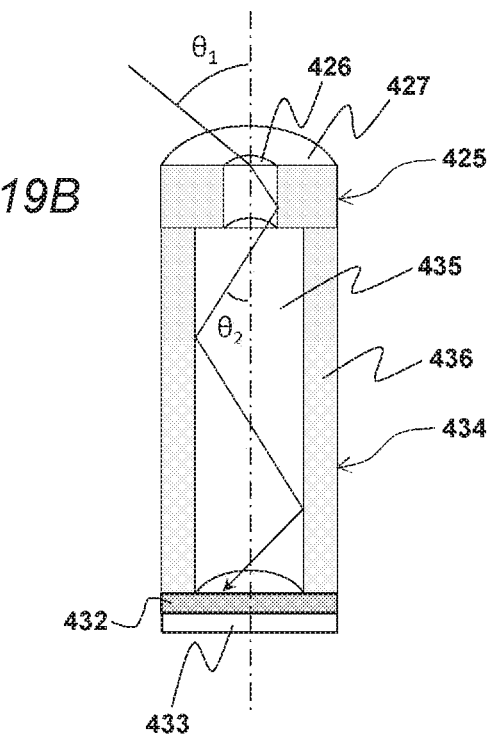

In addition, as illustrated in FIG. 19(b), it is preferable that the diameter of the core portion 426 of the first optical fiber 425 is less than the diameter of the core portion 435 of the second optical fiber 434. Accordingly, it is possible to reliably transmit the light exiting from the core portion 426 of the first optical fiber 425 in the first exiting portion 425a into the core portion 435 of the second optical fiber 434 in the second incident portion 434a, and to more accurately perform the fluorescence detection.

Figure 14:
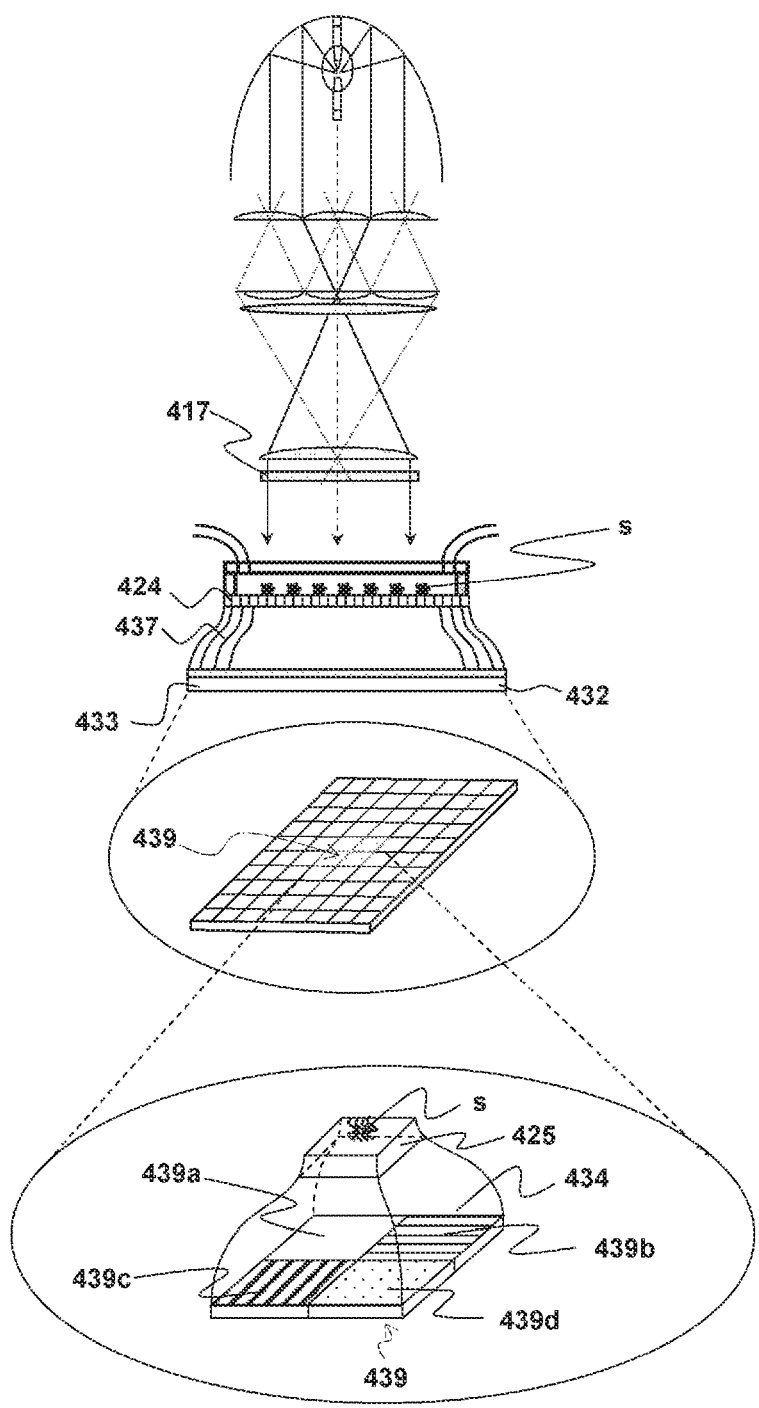
FIG. 14 is a schematic view in a case where a fiber optic taper is adopted as the second fiber optic plate in the fluorescence detection sections of FIGS. 2A and 2B.

In addition, fiber optic tapers (FOT) can be respectively adopted as the first and second fiber optic plates described above. FIG. 14 is a schematic view in a case where the fiber optic tapers are adopted as the second fiber optic plates in the fluorescence detection sections of FIGS. 2(a) and 2(b). As illustrated in FIG. 14, the FOT 437 is a bundle of second optical fibers having a size different from that of the second incident portion and the second exiting portion, and an image of the second incident portion can be enlarged or reduced. An enlargement factor of the image described above simply is a ratio of the diameters of both end surfaces of one second optical fiber. In general, the ratio is maximally approximately 5 times. Furthermore, in the FOT the size of the second incident portion is different from that of the second exiting portion, but the number of second optical fibers of the second incident portion is identical to that of the second exiting portion.

In the FOT, for example, a center portion of a cylindrical FOP is heated, and force is applied to both terminals of the FOP in opposite directions, and thus, the center portion of the FOP is rolled. Next, the rolled center portion of the FOP is cut, and then, a sectional surface thereof is ground to be one surface of the FOT, and thus, it is possible to manufacture a FOT having two surfaces of which the sizes are different from each other. Furthermore, the shape of the optical fiber of the FOT can be freely changed, for example, from a circular shape to a circular shape, from a circular shape to a square shape, from a square shape to a square shape, from a square shape to a rectangular shape, and the like, by controlling the rolling described above.

Thus, in the FOT, the size of the second incident portion is different from the size of the second exciting portion, and thus, for example, the FOT is used at the time of directly coupling an imaging surface having a large aperture of an image intensifier (a light amplification optical device) or the like to each element of a CMOS image sensor having a small imaging surface. Accordingly, it is possible to transmit a bright image to an imaging element without decreasing combined resolving power. In addition, in a case where the sectional area of the second optical fiber gradually increases towards the second exiting portion (refer to FIG. 14), the incident angle with respect to the first dielectric multilayer film interference filter decreases, according to the repetition of the total reflection of the light. Accordingly, it is possible to decrease a shift of transmission spectroscopic properties to a short wavelength side (hereinafter, also referred to as a "short wavelength shift") according to the incident angle with respect to the first dielectric multilayer film interference filter, and to widen the transmission wavelength band of the first dielectric multilayer film interference filter compared to a case where the sectional area of the second incident portion is identical to the sectional area of the second exiting portion.

The first dielectric multilayer film interference filter 432 is disposed on an end surface of the second exiting portion 434b, and is a single filter which transmits at least a part of the fluorescent light and transmits light in a plurality of transmission wavelength bands not including the excitation wavelength band. As with the second dielectric multilayer film interference filter 417 described above, the first dielectric multilayer film interference filter 432 is configured of a glass substrate (not illustrated) which is transparent with respect to visible light, and a dielectric multilayer film (not illustrated) which is formed on the glass substrate. Here, a film thickness of each layer and the number of layers configuring the dielectric multilayer film described above are suitably determined such that the excitation light can be shielded and light in a desired wavelength band (a part or all of the fluorescent light) can be transmitted. Accordingly, it is possible to more accurately perform the fluorescence detection by suppressing a noise derived from the excitation light.

Furthermore, in order to sufficiently exhibit transmission performance of each wavelength band in the first and second dielectric multilayer film interference filters 432 and 417, the incident angle with respect to each of the filters described above is required to be generally 0±5° with respect to the filter surface as specifications. This is because in a case where the incident angle with respect to the described above filter increases, the light in the wavelength band which is transmitted through the filter is shifted to the short wavelength side. Such a phenomenon can be expressed by a numerical expression represented by Expression (4) described below.

[Expression 4]

$$\lambda(\theta)/\lambda_0 = \sqrt{1-(\sin\theta/n_{\text{eff}})^2} \quad (4)$$

In Expression (4) described above, $\theta$ is an incident angle. $n_{\text{eff}}$ is an effective refractive index, and is a specific value of each of the filters. $\lambda_0$ is a wavelength when a light ray is incident at an incident angle of 0°. $\lambda(\theta)/\lambda_0$ is a ration of a short wavelength shift which occurs when the incident angle of the light ray incident on the filter is $\theta$.

In Expression (4) described above, in a case where the effective refractive index $n_{\text{eff}}$ of the filter is set to 1.5, for example, the ratio of the short wavelength shift ($\lambda(\theta)/\lambda_0$) is approximately 0.94 in a case where the incident angle is 30° ($\theta$=30°). This indicates that the light is shifted to the short wavelength side by 0.06 wavelength (0.06 $\lambda_0$), compared to a case where an incident angle of light in a wavelength band which is transmitted through a dielectric multilayer film interference filter is 0° ($\theta$=0°).

FIGS. 6(a) to 6(d) are schematic views illustrating a relationship between the fluorescent light and the excitation light, using the incident angle of the fluorescent light with respect to the first fiber optic plate as a parameter, in the fluorescence detection sections of FIGS. 2(a) and 2(b). The drawings illustrate a relationship in a case where Cy3 is used as the fluorescent pigment. Furthermore, characteristics represented by a reference numeral of 503 represent a fluorescence spectrum of Cy3.

Figure 6A:
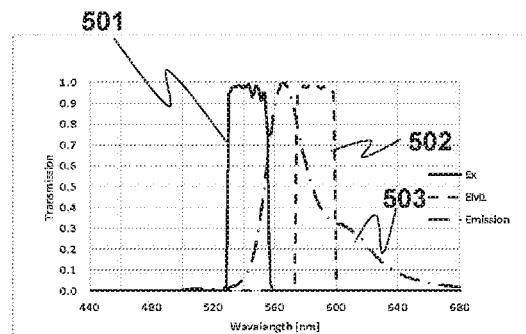
FIGS. 6A to 6D are schematic views illustrating a relationship between fluorescent light and excitation light, in which an incident angle of the fluorescent light with respect to the first fiber optic plate is used as a parameter, in the fluorescence detection sections of FIGS. 2A and 2B.
Figure 6B:
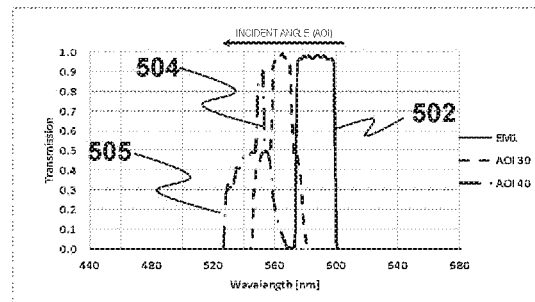
Figure 6C:
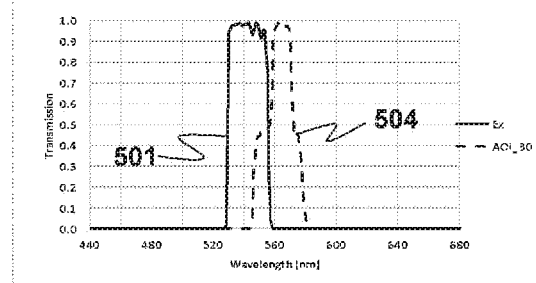

In this embodiment, in order to propagate light incident on the first optical fiber 425 by performing the total reflection with respect to the light in the core portions 426 and 435, it is necessary that the light is incident on the first dielectric multilayer film interference filter 432 at the maximum incident angle of 30°. In this case, as illustrated in FIG. 6(b), the light in the transmission wavelength band is shifted to the short wavelength side (for example, the transmission wavelength band 502 at an incident angle of 0° is shifted to the transmission wavelength band 504 at an incident angle of 30° and is shifted to the transmission wavelength band 505 at an incident angle of 40°), compared to light having an incident angle of 0°. For this reason, for example, in the case of using the first dielectric multilayer film interference filter 432 having the transmission wavelength band 502 at the incident angle of 0° described above, as illustrated in FIG. 6(c), the transmission wavelength band 501 of the second dielectric multilayer film interference filter 417 overlaps with the transmission wavelength band 504 of the first dielectric multilayer film interference filter 432 of which the maximum incident angle is 30° due to the short wavelength shift described above, and thus, it is considered that imperceptible fluorescent light is buried in tremendous excitation light and is not capable of being detected due to the transmission of a part of the excitation light in the first dielectric multilayer film interference filter 432.

Therefore, it is preferable that the transmission wavelength bands of the first and second dielectric multilayer film interference filters 432 and 417 are determined in consideration of the short wavelength shift described above in advance. It is preferable that a rising wavelength ($\lambda_{1i}$) satisfying a relationship where a transmittance ($\alpha_1$) of the light in the transmission wavelength band of the first dielectric multilayer film interference filter 432 is less than a predetermined value ($\alpha$) and a falling wavelength ($\lambda_{2j}$) satisfying a relationship where a transmittance ($\alpha_2$) of the light in the transmission wavelength band of the second dielectric multilayer film interference filter 417 is less than the predetermined value ($\alpha$) described above satisfy a relationship represented by Expression (1) described above, as a relationship between both of the dielectric multilayer film interference filters 432 and 417 described above.

In Expression (1) described above, i and k are respectively integers of greater than or equal to 1. $\theta_{max}$ is the maximum incident angle of the light which is incident on the first dielectric multilayer film interference filter. $n_{eff}$ is an effective refractive index of the first dielectric multilayer film interference filter.

Thus, the transmission wavelength band of the first and second dielectric multilayer film interference filters 432 and 417 satisfies the relationship described above, and thus, it is possible to prevent both of the transmission wavelength bands from overlapping each other even in a case where the short wavelength shift occurs, and to reliably distinguish the fluorescent light from the excitation light.

Here, it is preferable that the predetermined value ($\alpha$) is 0.1%. By setting the predetermined value ($\alpha$) as described above, it is possible to effectively prevent both of the transmission wavelength bands from overlapping each other even in a case where the transmitted light is shifted to the short wavelength side, and to more reliably distinguish the fluorescent light from the excitation light.

Figure 6D:
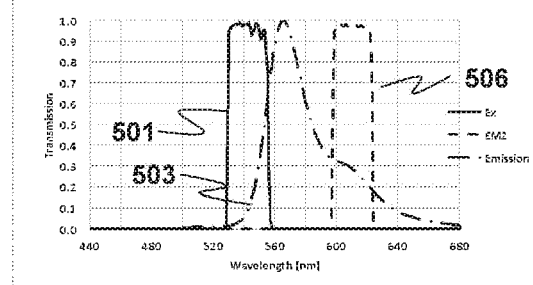

For example, as illustrated in FIG. 6(d), the rising wavelength of the transmission wavelength band of the first dielectric multilayer film interference filter 432 at an incident angle of 0° is 600 nm (refer to a reference numeral of 506), and the falling wavelength of the transmission wavelength band of the of the excitation light in the second dielectric multilayer film interference filter 417 is 560 nm, as an example where the predetermined value (α) described above is 0.1%, and the relationship of Expression (1) described above is satisfied.

In the example described above, in a case where incident light is incident on the first dielectric multilayer film interference filter 432 at an incident angle of 0°, the rising of the transmission wavelength band is 600 nm, but in a case where the incident light has an incident angle of 30°, the rising wavelength described above is calculated as 564 nm from a right side of Expression (1) described above (calculated with $n_{eff}$=1.5). Here, in a case where the falling wavelength ($\lambda_{2j}$) of the transmission wavelength band of the excitation light is set to 560 nm, above described rising wavelength satisfies the relationship of Expression (1) described above, and thus, even in a case where the short wavelength shift occurs, it is possible to reliably detect the imperceptible fluorescence by maintaining an optical density (OD) to be greater than or equal to 6 by shielding the excitation light without the overlap between the transmission wavelength bands of the first and second dielectric multilayer film interference filters 432 and 417.

Furthermore, in this embodiment, an example has been described in which the effective refractive index ($n_{eff}$) of the first dielectric multilayer film interference filter 432 is 1.5, but in the multicolor fluorescence analysis device of the present invention, it is preferable that the effective refractive index ($n_{eff}$) of the first dielectric multilayer film interference filter 432 is greater than or equal to 1.5 and less than or equal to 2.2. Thus, the effective refractive index ($n_{eff}$) of the first dielectric multilayer film interference filter 432 is set to be in the range described above, and thus, even in a case where the short wavelength shift occurs, it is possible to effectively prevent the overlap between the transmission wavelength bands of the first and second dielectric multilayer film interference filters 432 and 417, and to more reliably distinguish the fluorescent light from the excitation light. The effective refractive index described above is more preferably greater than or equal to 1.7 and less than or equal to 2.2, and is even more preferably greater than or equal to 2.0 and is less than or equal to 2.2, from the viewpoint of reducing the short wavelength shift.

In addition, it is preferable that the maximum incident angle ($\theta_{max}$) of the light incident on the first dielectric multilayer film interference filter 432 is 30°. Thus, the maximum incident angle in the first dielectric multilayer film interference filter 432 is set to the value described above, and thus, it is possible to suppress a loss in the light guided by the first and second optical fibers 425 and 434, and to more reliably detect the fluorescent light. Furthermore, setting the maximum incident angle to the value described above is more effective for analysis in which the first incident portion 425a is in contact with a liquid including water such as an aqueous solution or pure water, as the analysis for the base sequence of the DNA segment in this embodiment, from the viewpoint of suppressing the loss of the light to be guided. The maximum incident angle described above is more preferably 20°, and is even more preferably 10°.

In addition, in a case where the fluorescent pigment used for the fluorescence analysis is Alexa405, FAM, Texas Red, and Cy5.5, the transmittance of the second dielectric multilayer film interference filter 417 is greater than or equal to 85% at wavelengths of 380 nm to 396 nm, 474 nm to 497 nm, 561 nm to 575 nm, and 641 nm to 657 nm, and is less than 0.1% at a wavelength other than the wavelengths described above, as illustrated in FIG. 10(b), it is preferable that the transmittance of the first dielectric multilayer film interference filter 432 is greater than or equal to 85% in wavelength bands of 436 nm to 462 nm, 536 nm to 548 nm, 620 nm to 632 nm, and 713 nm to 800 nm, and is less than 0.1% in a wavelength band other than the wavelength bands described above.

Figure 10A:
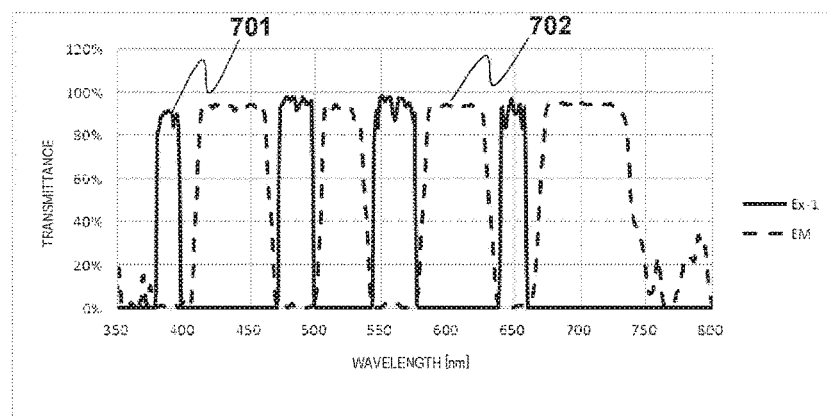
FIGS. 10A to 10C are schematic spectroscopic characteristic diagrams in the fluorescence detection section of FIG.
Figure 10B:
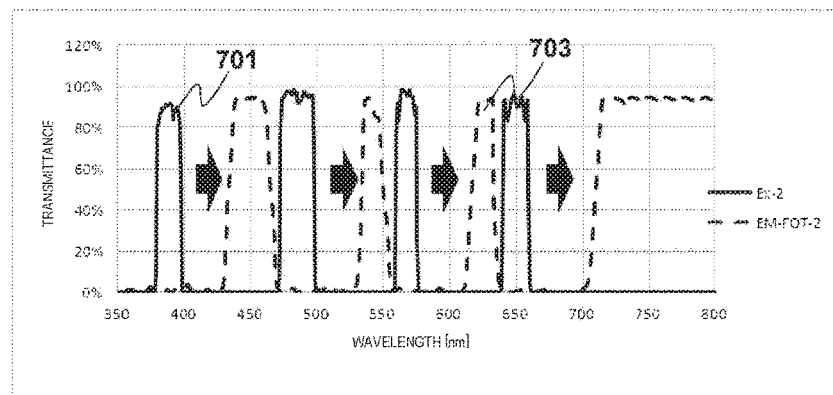
Figure 10C:
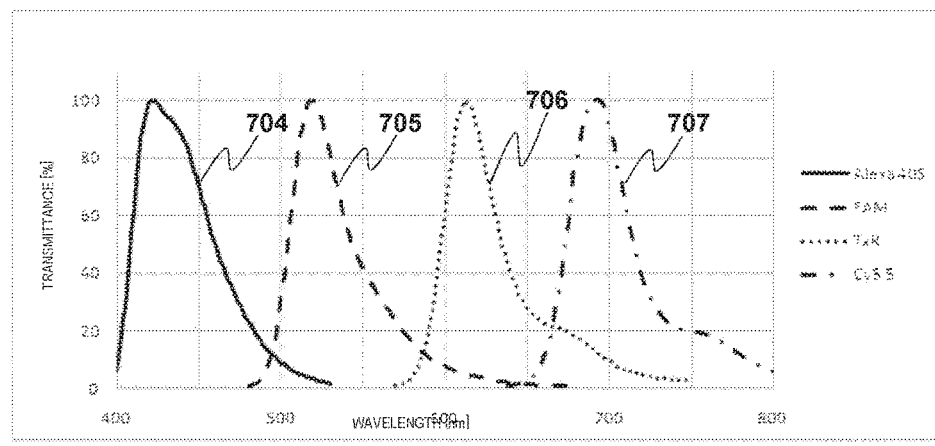

Such a preferred configuration is based on the fact that the rising wavelength of the transmission wavelength band 702 of the first dielectric multilayer film interference filter illustrated in FIG. 10(a) is moved to a long wavelength side by 0.06 wavelength (0.06 $\lambda_0$) (refer to a reference numeral of 703), in consideration of a case where maximum absorb wavelengths and maximum fluorescence wavelengths of Alexa405, FAM, Texas Red, and Cy5.5 described above are respectively 401 nm and 421 nm with respect to Alexa405, 494 nm and 518 nm with respect to FAM, 596 nm and 615 nm with respect to Texas Red, and 675 nm and 694 nm with respect to Cy5.5 (regarding a fluorescence wavelength, refer to reference numerals of 704 to 707 in FIG. 10(c)), and the maximum incident angle with respect to the first dielectric multilayer film interference filter 432 is 30°.

Thus, the transmittance of the first dielectric multilayer film interference filter 432 is set to the wavelength band described above, and thus, in the case of using the fluorescent pigments described above and the second dielectric multilayer film interference filter 417, for example, it is possible to reliably shield the excitation light with the optical density of OD6, and to more reliably recognize each of the fluorescent pigments, even in a case where the incident light is incident on the first dielectric multilayer film interference filter 432 at the maximum incident angle of 30° (in a case where the short wavelength shift occurs).

Figure 11A:
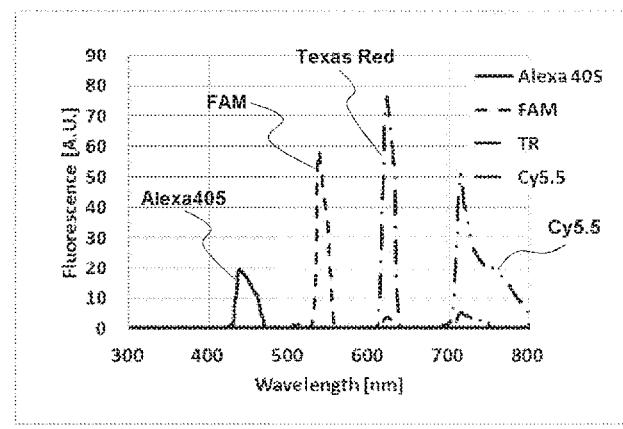
FIGS. 11A and 11B are schematic characteristic diagrams of the two-dimensional detection units in the fluorescence detection sections of FIGS. 2A and 2B.

As a result thereof, as illustrated in FIG. 11(a), a fluorescence spectrum which is transmitted through the first dielectric multilayer film interference filter 432 is obtained by cutting the excitation light. Furthermore, in the illustrated fluorescence spectrum, a possibility that an arbitrary DNA segment takes in a specific type of fluorescent pigment from four types of fluorescent pigments described above is 25%, the number of fluorescent pigments contained in each DNA segment (the number of fluorescent molecules) is the same, and an absorbance index, a quantum yield, and the like are taken into consideration.

The two-dimensional detection unit 433 is disposed to be closely attached to the first dielectric multilayer film interference filter 432, and detects the light (the fluorescent light) which is transmitted through the first dielectric multilayer film interference filter 432. The two-dimensional detection unit 433, for example, is configured of a two-dimensional optical sensor which is capable of detecting light (fluorescent light) to be incident thereon, and detects the light (the fluorescent light) described above as a two-dimensional image. A double-layer type CMOS image sensor having wavelength resolving power in the optical axis direction is preferable as the two-dimensional optical sensor described above from the viewpoint of performing color separation in the same position in a light receiving surface direction of the two-dimensional optical sensor. The CMOS image sensor is also preferable from the viewpoint of a reduction in the price and a reduction in the size. In this embodiment, in order to maximally increase space resolution, the size of a pixel of the CMOS image sensor is formed so that the size of a pixel of the CMOS image sensor is identical to the size of the optical fiber (the outer diameter). Furthermore, the two-dimensional optical sensor described above adheres to the first dielectric multilayer film interference filter 432 with an adhesive agent.

Figure 9:
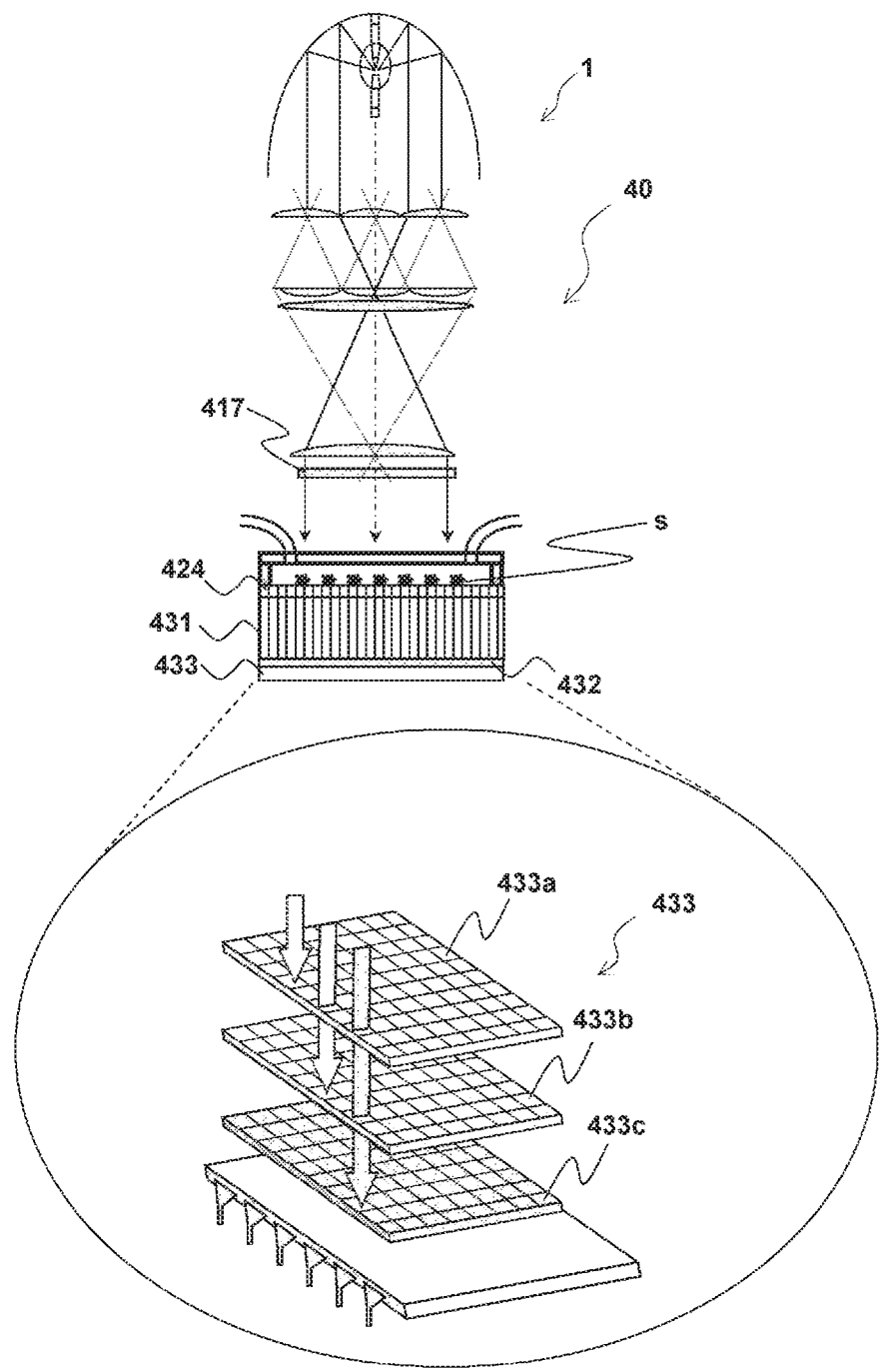
FIG. 9 is a schematic view for describing an aspect of the two-dimensional detection units in the fluorescence detection sections of FIGS. 2A and 2B.

As illustrated in FIG. 9, for example, the two-dimensional optical sensor described above includes a three-layer sensor (a first layer sensor 433$a$, a second layer sensor 433$b$, and a third layer sensor 433$c$). Each of the sensors to be used has detection sensitivity corresponding to the wavelength of the fluorescent light to be detected. For example, in the case of using four types of fluorescent pigments described above as in this embodiment, as illustrated in FIG. 11($b$), it is possible to adopt a layer sensor of which detection sensitivity has a peak at each of 500 nm, 585 nm, and 675 nm, as the first to third layer sensors 433$a$ to 433$c$ described above.

Figure 11B:
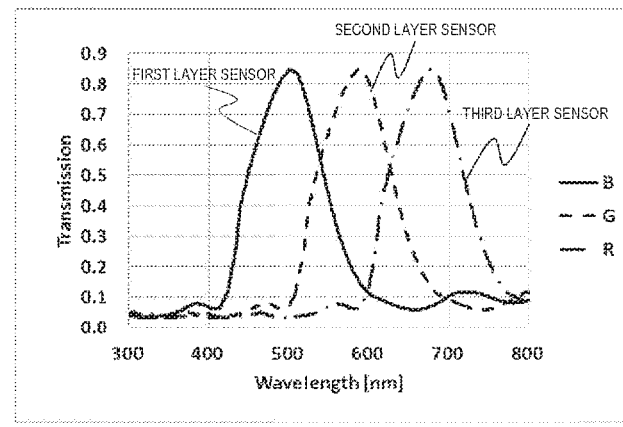

In the case of detecting the fluorescent light having a fluorescence spectrum illustrated in FIG. 11($a$) described above by using the first to third layer sensors 433$a$ to 433$c$, a signal to be detected by each of the sensors is an intensity ratio shown in Table 1. As it is obvious from Table 1, for example, as the intensity ratio of each signal, in a case where the first layer sensor 433 $a$ is 83%, it can be determined as Alexa405, in a case where the first layer sensor 433$a$ and the second layer sensor 433$b$ are respectively 43% and 49%, it can be determined as FAM, in a case where the second layer sensor 433$b$ and the third layer sensor 433$c$ are respectively 46% and 46%, it can be determined as Texas Red, and in a case where the second layer sensor 433$b$ and the third layer sensor 433$c$ are respectively 14% and 66%, it can be determined as Cy5.5.

TABLE 1

| Fluorescent Pigment | First Layer Sensor | Second Layer Sensor | Third Layer Sensor |
| --- | --- | --- | --- |
| Alexa405 | 0.83 | 0.10 | 0.07 |
| FAM | 0.43 | 0.49 | 0.07 |
| Texas Red | 0.08 | 0.46 | 0.46 |
| Cy5.5 | 0.20 | 0.14 | 0.66 |

Figure 12:
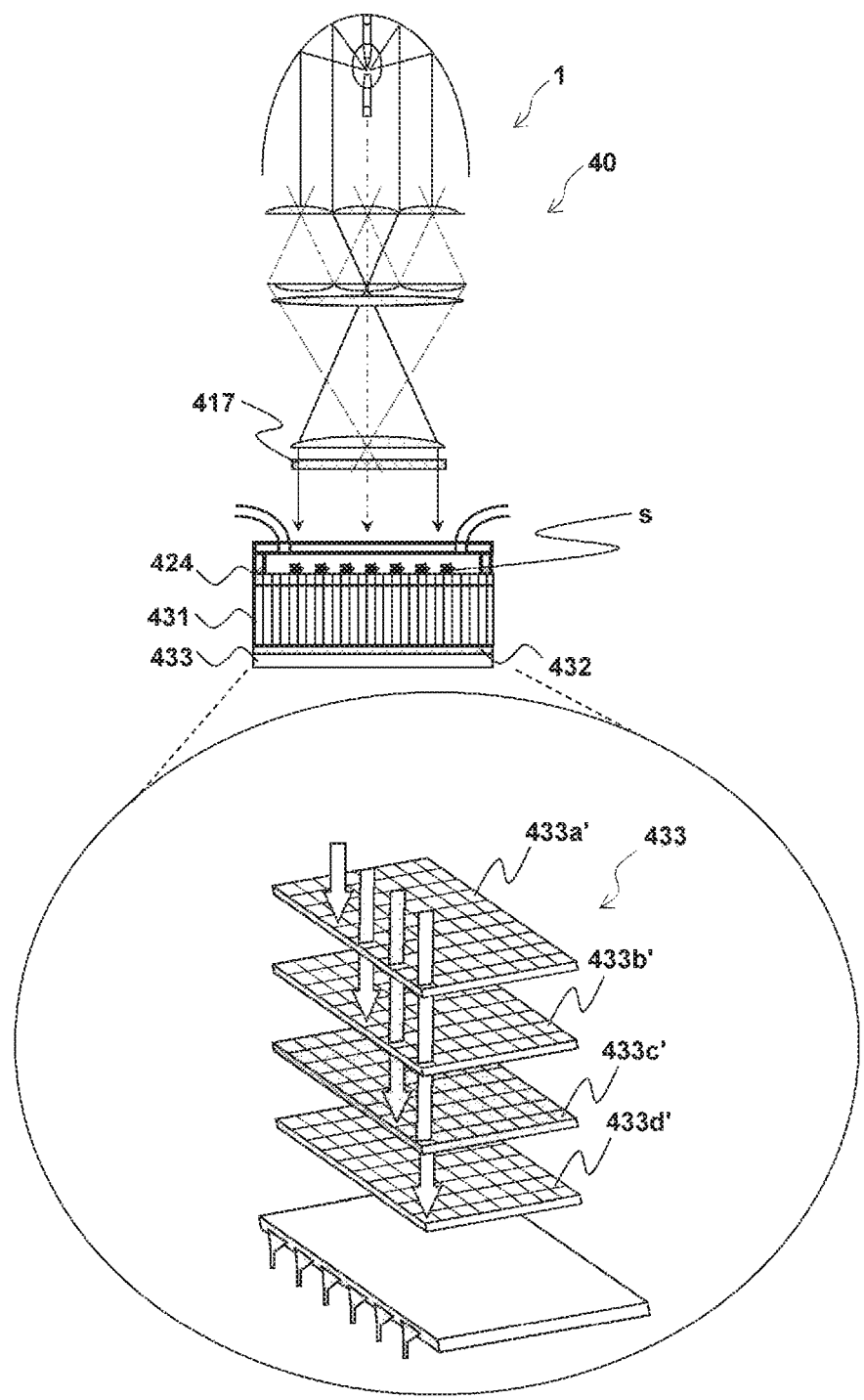
FIG. 12 is a schematic view illustrating another aspect of the two-dimensional detection units in the fluorescence detection sections of FIGS. 2A and 2B.
Figure 13A:
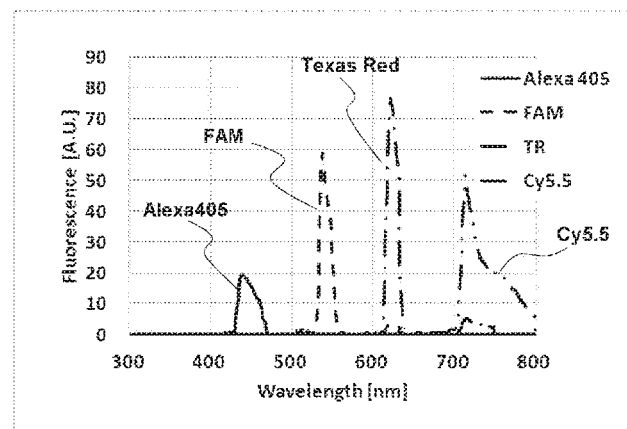
FIGS. 13A and 13B are schematic characteristic diagrams of the two-dimensional detection units in the fluorescence detection sections of FIG. 12.
Figure 13B:
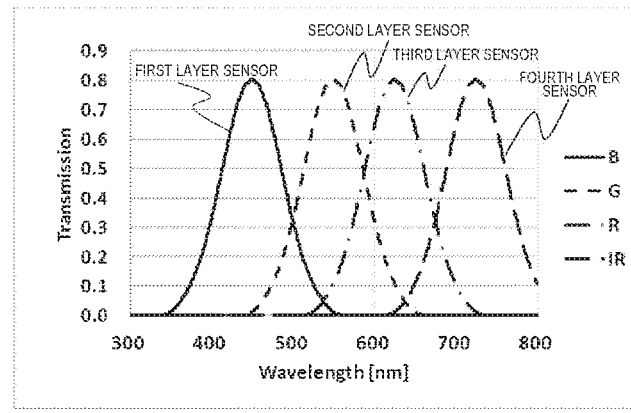

In addition, it is possible to adopt, as the two-dimensional optical sensor described above, a layer sensor provided with four layers of sensors (a first layer sensor 433$a'$, a second layer sensor 433$b'$, a third layer sensor 433$c'$, and a fourth layer sensor 433$d'$) as illustrated in FIG. 12, the first to fourth layer sensors 433$a'$ to 433$d'$ having peaks at 450 nm, 550 nm, 625 nm, and 725 nm respectively as illustrated in FIG. 13($b$).

In the case of detecting the fluorescent light having a fluorescence spectrum illustrated in FIG. 13($a$) (a fluorescence spectrum similar to the fluorescence spectrum illustrated in FIG. 11($a$)) by using the first to fourth layer sensors 433$a'$ to 433$d'$, a signal to be detected by each sensor has an intensity ratio shown in Table 2. As it is obvious from Table 2, for example, as the intensity ratio of each signal, in a case where the first layer sensor 433$a'$ is 98%, it can be determined as Alexa405, in a case where the second layer sensor 433$b'$ is 83%, it can be determined as FAM, in a case where the third layer sensor 433$c'$ is 78%, it can be determined as Texas Red, and in a case where the fourth layer sensor 433$d'$ is 98%, it can be determined as Cy5.5.

TABLE 2

| Fluorescent Pigment | First Layer Sensor | Second Layer Sensor | Third Layer Sensor | Fourth Layer Sensor |
| --- | --- | --- | --- | --- |
| Alexa405 | 0.98 | 0.02 | 0.00 | 0.00 |
| FAM | 0.04 | 0.83 | 0.13 | 0.00 |
| Texas Red | 0.00 | 0.11 | 0.78 | 0.11 |
| Cy5.5 | 0.00 | 0.00 | 0.02 | 0.98 |

Figure 20:
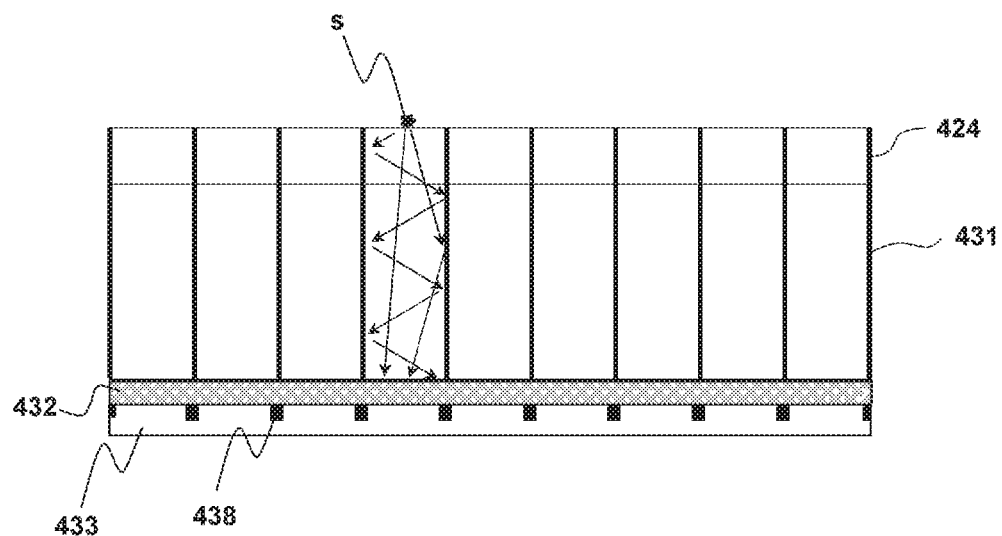
FIG. 20 is a schematic view illustrating an aspect in which a light partition is disposed between the first dielectric multilayer film interference filter and the two-dimensional optical sensor in the fluorescence detection sections of FIGS. 2A and 2B.

Furthermore, as illustrated in FIG. 20, in the fluorescence detection unit 43, a light partition 438 reflecting light may be disposed on a boundary portion of the adjacent pixels between the first dielectric multilayer film interference filter 432 and the two-dimensional detection unit 433. Accordingly, in the two-dimensional detection unit 433, it is possible to prevent wrap-around of the light with respect to the other adjacent pixels, and to improve light condensing efficiency, and as a result thereof, it is possible to improve S/N of signal detection, to improve color separation capability of a DNA sequence, and to suppress a decrease in the number of samples to be detectable by one reaction, due to reduction in the contamination between the pixels.

A thin film formed of aluminum, silver, gold, copper, and tungsten, and an alloy thereof is preferable as the light partition 438 from the viewpoint of obtaining high reflectivity, and an aluminum thin film is more preferable as the light partition 438 from the viewpoint of improving reliability and workability. It is preferable that the dimension of the light partition 438 has a height of greater than or equal to 500 nm and less than or equal to 1,000 nm and a width of greater than or equal to 200 nm and less than or equal to 500 nm, from the viewpoint of improving manufacturing easiness. Such a light partition 438, for example, can be formed by performing vapor deposition with respect to the material described above on the first dielectric multilayer film interference filter 432 by using a CVD method, a sputtering method, and the like.

Next, a method of determining the type of fluorescent pigment will be described. In order to determine the type of fluorescent pigment, first, crosstalk is eliminated. In the crosstalk elimination, for example, in the case of Texas Red shown in Table 2 described above, signal amounts to be detected by the first layer to fourth layer sensors 433$a'$ to 433$d'$ are respectively 0.00, 0.11, 0.78, and 0.11. This indicates that a main component of monochromatic fluorescent light of Texas Red can be basically detected by the third layer sensor 433$c'$, but the fluorescent light of Texas Red is detected by the first layer sensor 433$a'$, the second layer sensor 433$b'$, and the fourth layer sensor 433$d'$ as the crosstalk. A relationship between the fluorescence intensities of such four types of fluorescent pigments and the signal amounts detected by the four-layer sensors 433$a'$ to 433$d'$ is a determinant represented by Expression (5) described below.

[Expression 5]

$$\begin{bmatrix} S_1 \\ S_2 \\ S_3 \\ S_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} Dye_1 \\ Dye_2 \\ Dye_3 \\ Dye_4 \end{bmatrix} = W \begin{bmatrix} Dye_1 \\ Dye_2 \\ Dye_3 \\ Dye_4 \end{bmatrix} \quad (5)$$

In Expression (5) described above, $S_1$, $S_2$, $S_3$, and $S_4$ are respectively the signal amounts detected by the first layer sensor, the second layer sensor, the third layer sensor, and the fourth layer sensor. In addition, $Dye_1$, $Dye_2$, $Dye_3$, and $Dye_4$ are the fluorescence intensities emitted by Alexa405, FAM, Texas Red, and Cy5.5. W is a matrix having $w_{ij}$ (i=1, 2, 3, 4, j=1, 2, 3, 4) as an element, and is a matrix associating the fluorescence intensity described above with the signal amount.

Here, the fluorescence intensity from which the crosstalk described above is eliminated, is obtained as in Expression (6) described below by multiplying $W^{-1}$ which is an inverse matrix of W from the left.

[Expression 6]

$$\begin{bmatrix} Dye_1 \\ Dye_2 \\ Dye_3 \\ Dye_4 \end{bmatrix} = W^{-1} \begin{bmatrix} S_1 \\ S_2 \\ S_3 \\ S_4 \end{bmatrix} \quad (6)$$

In Expression (6) described above, $Dye_1$ to $Dye_4$ and $S_1$ to $S_4$ are identical to those in Expression (5) described above. $W^{-1}$ is the inverse matrix of W.

Next, the obtained fluorescence intensity is normalized, and conversion is performed such that the fluorescence intensity which is different for each fluorescent pigment is equalized. As described above, the crosstalk is eliminated, for example, and thus, it is possible to efficiently recognize the fluorescent pigment taken in the sample.

Next, a method of performing the DNA sequence by using the multicolor fluorescence analysis device 1 (the DNA sequencer) will be described. Furthermore, here, the multicolor fluorescence analysis device 1 is a CMOS image sensor in which the two-dimensional optical sensor has the number of pixels of 41 megapixels, and the CMOS image sensor includes the four layers of sensors 433a' to 433d' having the wavelength resolving power in the optical axis direction. In addition, only one DNA segment, which is the sample s, is adsorbed with respect to one first optical fiber 425 in the substrate 423, one light waveguide is formed of one first optical fiber 425 and one second optical fiber 434, and one pixel of the CMOS image sensor (one pixel group in the two-dimensional optical sensor illustrated in FIG. 14) corresponds to one light waveguide.

First, in order to analyze a base sequence of the DNA segment, which is the sample s, an SBS reaction is performed on the substrate 423. A reagent required for the reaction described above is a primer reagent, a polymerase enzyme, an extension reagent containing and a nucleotide including four types of fluorescent pigments, a protecting group cleaving reagent, a washing reagent, and an imaging reagent. Such reagents are contained in the reagent storage container 102 in the reagent cartridge 101. In addition, the reagent cartridge 101 is disposed in a reagent rack 103, and is cooled to 4° C.

In a cooling method, for example, a heat block 105 and a heat sink 106 are cooled by using a Peltier element 104, the air cooled by the heat sink 106 and the like is blown into the reagent rack 103 by a fan 107, and the reagent is cooled at 4° C. Furthermore, heat rejection from the Peltier element 104 is performed by using the fan 108.

Next, the reagent cooled to 4° C. in the reagent rack 103 is introduced to the flow path 202. At this time, switching is performed by the switching valve 201, and thus, it is possible to introduce an arbitrary reagent to the flow path 202. The reagent introduced to the flow path 202 is fed by driving the syringe 204 which is disposed on the downstream side of the flow path 203 from the flow chip 42. Specifically, two two-way valves 205 and 206 are disposed on the flow path 203, and when the reagent or the like is sucked into the syringe 204 (the reagent or the like is supplied to the flow chip 42 and the used reagent or the like is discharged from the flow chip 42), the syringe 204 is driven in a state where the two-way valve 205 is opened and the two-way valve 206 is closed.

On the other hand, when the reagent or the like in the syringe 204 (the waste liquid) is discharged to the waste liquid tank 301, the syringe 204 is driven in a state where the two-way valve 205 is closed and the two-way valve 206 is opened. Accordingly, it is possible to suck and discharge the reagent by one syringe 204. The reagent or the like, which is the waste liquid, is fed to the waste liquid tank 301 and is accumulated therein. The waste liquid tank 301 is disposed to prevent electrification, the rust of the device, the occurrence of strange odor, and the like due to waste liquid spillage. The presence or absence of the waste liquid tank 301 is monitored by the microphotosensor 304.

Here, the SBS reaction performed in the flow chip 42 to which the reagent or the like is supplied will be described. In such a reaction, an extension reagent is fed into the flow chip 42. The extension reagent contains four types of nucleotides labelled with a fluorescent pigment and polymerase. The four types of fluorescence nucleotides described above are Alexa405-dCTP, FAM-dATP, Texas Red-dGTP, and Cy5.5-dTTP, and each of the fluorescence nucleotides are respectively contained in the extension reagent described above at a density of 200 nM. A salt concentration, a magnesium concentration, and pH of the extension reagent are optimized such that an extension reaction is efficiently performed. In addition, a complementary fluorescence nucleotide is taken in a base, which is an analysis target, in a portion where a primer in the DNA segment is hybridized, according to the action of the polymerase contained in the extension reagent. Furthermore, the fluorescence nucleotides of two bases do not extend at one time, because a portion of inhibiting extension of the fluorescence nucleotide of the second base is included in the fluorescent pigment of the first base.

Next, a washing reagent is fed into the flow chip 42. The washing reagent is fed, and thus, fluorescent nucleotide which does not contribute to a reaction and is suspended in the flow chip 42 is eliminated. Next, an imaging reagent is fed into the flow chip 42, and substitutes for the washing reagent described above, and then, the fluorescence detection is performed. After the fluorescence detection, a protecting group cleaving reagent is fed into the flow chip 42. The protecting group cleaving reagent is fed, and thus, the fluorescent pigment is cut from the fluorescent nucleotide, and the next extension reaction (the extension reaction of the fluorescent nucleotide of the second base) can be performed. After that, the operation described above is repeated, and thus, it is possible to perform the DNA sequence, and to analyze a base sequence of greater than 500 bases from one DNA segment.

Here, the fluorescence detection described above will be described with reference to FIG. 2(a). In the fluorescence detection section of the multicolor fluorescence analysis device 1, white light emitted from the light source is reflected on the parabolic mirror 412 and is converted into parallel light. The light converted into the parallel light forms a light source image on the second fly eye lens 414 by the first fly eye lens 413, and becomes uniform parallel light through the compound lens 415 and the field lens 416. The parallel light is converted into excitation light having a plurality of excitation wavelength bands different from each other by using the second dielectric multilayer film interference filter 417 (refer to characteristics of a solid line in FIG. 10(b)), four types of fluorescence nucleotides taken in the DNA segment, which is the sample s, are each independently excited. At this time, the complementary fluorescence nucleotide is taken in the base of the DNA segment, and thus, fluorescent light corresponding to the type of fluorescent pigment contained in each of the fluorescence nucleotides is emitted(refer to FIG. 10(c)). Furthermore, the light emitted from the DNA segment includes the excitation light reflected on the DNA segment or the like described above in addition to the fluorescent light described above.

The light including the fluorescent light proceeds while being subjected to the total reflection in the light waveguide described above, and reaches the first dielectric multilayer film interference filter 432. When the light passes through the first dielectric multilayer film interference filter 432, only light in a wavelength band which can be transmitted through the first dielectric multilayer film interference filter 432 is transmitted, and thus, the excitation light is shielded, and only the fluorescent light reaches the two-dimensional detection unit 433. The fluorescent light reaching the two-dimensional detection unit 433 is detected by the four layers of sensors 433a' to 433d' disposed on the two-dimensional optical sensor. At this time, the wavelength of the fluorescent light to be emitted is different according to the type of fluorescent pigment, and thus, it is possible to identify the type of fluorescence nucleotide according to a difference in intensity ratios of the light detected by the first to fourth layer sensors 433a' to 433d', and as a result thereof, it is possible to determine the base of the DNA segment.

Furthermore, in the case of performing the DNA sequence by using the method described above, one DNA segment corresponds to each pixel of the two-dimensional optical sensor, and thus, for example, one DNA segment includes 500 bases, and in a case the DNA segment is analyzed by using a CMOS image sensor having 41 Mpixels, the total number of read bases is 20 Gbases as a result thereof. In addition, in a case where SBS chemistry time per one base which is required for taking-in is set to 3 minutes/base, and imaging time is set to 3 seconds, it is possible to complete the extension reaction of 500 bases within approximately one day.

Furthermore, the present invention is not limited to the configuration of the embodiment described above, and includes all changes which are represented by claims, have equivalent meanings and range, and are within the scope of the claims.

For example, in the embodiment described above, the DNA sequencer configured of the reagent storage section 10, the liquid feeding section 20, the waste liquid storage section 30, and the fluorescence detection section 40 has been described as an example of the multicolor fluorescence analysis device 1, but the multicolor fluorescence analysis device 1 is not limited to a device for a DNA sequencer, and for example, a multicolor fluorescence analysis device not including the reagent storage section 10, the liquid feeding section 20, and the waste liquid storage section 30 is also within the scope of the present invention.

In addition, in the embodiment described above, the second dielectric multilayer film interference filter 417 for obtaining the excitation light has been used, but unless the effect of the present invention is impaired, other means such as a pigment filter may be adopted.

In addition, in the embodiment described above, it has been described that the fluorescent pigment has four types of Alexa405, FAM, Texas Red, and Cy5.5, but the type and the number of fluorescent pigments to be used can be suitably determined according to the sample. Furthermore, peak wavelengths absorbed by the fluorescent pigments different from each other are preferably separated from each other by greater than or equal to 50 nm, are more preferably separated from each other by greater than or equal to 80 nm, and are even more preferably separated from each other by greater than or equal to 120 nm. In addition, peak wavelengths of the fluorescent light emitted from the fluorescent pigments different from each other are preferably separated from each other by greater than or equal to 50 nm, are more preferably separated from each other by greater than or equal to 80 nm, and are even more preferably separated from each other by greater than or equal to 120 nm.

In addition, in the second dielectric multilayer film interference filter 417 described above, it has been described that the light mainly in the wavelength bands of 380 nm to 396 nm, 474 nm to 497 nm, 561 nm to 575 nm, and 641 nm to 657 nm is transmitted, but the light is not limited to the light in the wavelength bands described above insofar as it is possible to emit excitation light capable of exciting all fluorescent pigments, which are analysis targets, and to shield the excitation light described above with the first dielectric multilayer film interference filter 432. Furthermore, wavelength bands different from each other, of which the light is capable of being transmitted through the second dielectric multilayer film interference filter 417, are preferably separated from each other by greater than or equal to 50 nm, are more preferably separated from each other by greater than or equal to 80 nm, and are even more preferably separated from each other by greater than or equal to 120 nm.

In addition, in the first dielectric multilayer film interference filter 432 described above, a filter in which the transmittance is greater than or equal to 85% in the wavelength bands of 436 nm to 462 nm, 536 nm to 548 nm, 620 nm to 632 nm, and 713 nm to 800 nm, and the is less than 0.1% in the wavelength band other than the wavelength bands described above has been described as a preferred filter, but the wavelength band is not limited to the wavelength band described above insofar as it is possible to shield the excitation light. Furthermore, the wavelength bands different from each other, of which the light is capable of being transmitted through the first dielectric multilayer film interference filter 432, are preferably separated from each other by greater than or equal to 50 nm, are more preferably separated from each other by greater than or equal to 80 nm, and are even more preferably separated from each other by greater than or equal to 120 nm.

In addition, in the embodiment described above, the two-dimensional optical sensor formed of a plurality of layers has been described, but a two-dimensional optical sensor formed of a single layer can be adopted as the two-dimensional detection unit 433. As illustrated in FIG. 14, examples of such a two-dimensional optical sensor include a sensor in which one pixel group 439 arranged in a square of 2×2 pixels (for example, a Bayer array and the like) corresponds to one second optical fiber 434, and the like. In this case, for example, it is possible to use an element having the same wavelength characteristics as the wavelength characteristics of the first to fourth layer sensors 433a' to 433d' respectively illustrated in FIG. 13(b), as four pixels 439a to 439d configuring one pixel group 439 described above. For example, a known single plate type color CMOS image sensor and the like can be adopted as the two-dimensional optical sensor described above.

In addition, in the embodiment described above, the multicolor fluorescence analysis device 1 using a xenon short arc lamp has been described as the light source 411, and an LED such as a high-luminance LED may be used as the light source. The lifetime of the xenon short arc lamp described above is 500 hours to 1,000 hours, whereas the lifetime of the LED described above is longer than 20,000 hours, and is longer than the lifelong operation time of the multicolor fluorescence analysis device 1, and thus, it is not necessary to replace the light source according to the lifetime. In addition, it is possible to make a mechanical shutter unnecessary and to reduce power consumption. Furthermore, in the case of using such an LED, the xenon short arc lamp is a point light source, whereas the LED is a plane light source, and thus, as illustrated in FIG. 15, an aspheric lens 4191 is adopted in order to obtain the parallel light.

Figure 15:
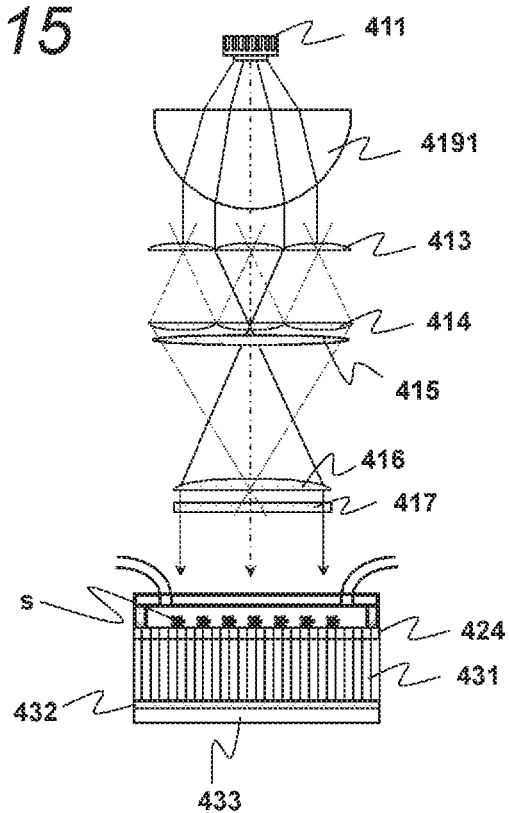
FIG. 15 is a schematic view illustrating an aspect in which an LED is used as a light source of the irradiation units in the fluorescence detection sections of FIGS. 2A and 2B.
Figure 16:
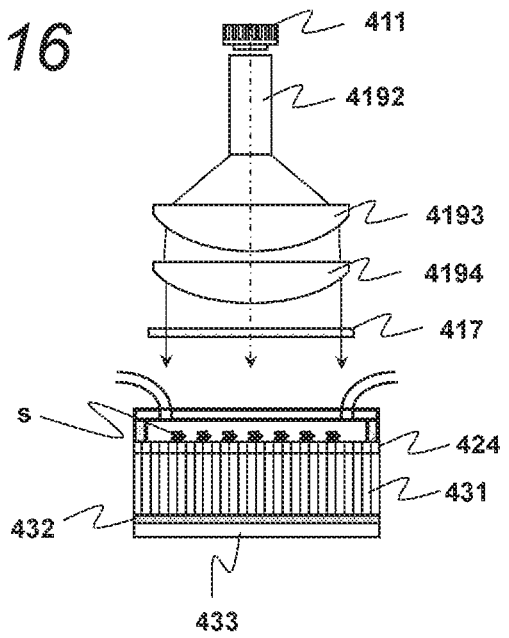
FIG. 16 is a schematic view illustrating an aspect in which a light pipe is used as the irradiation unit of the fluorescence detection section of FIG. 16.

In addition, in the case of using the LED as the light source 411, as illustrated in FIG. 16, a light pipe 4192 and an aspheric lenses 4193 and 4194 may be used instead of the aspheric lens 4191 or the like illustrated in FIG. 15. The light pipe 4192 has a function of uniformizing light incident from an end surface of the light pipe 4192 by performing the total reflection with respect to the light in the light pipe 4192. Specifically, for example, an end surface on a side on which the light of the light pipe 4192 incident and a light emitting surface of the LED described above are close to each other such that a distance therebetween is less than or equal to 1 mm, and first and second aspheric lenses 4193 and 4194 are disposed on the light pipe 4192 on a side opposite to the LED described above. Accordingly, it is possible to efficiently condense the light emitted from the LED, to convert the light to the parallel light, and to guide the light to the second dielectric multilayer film interference filter 417.

Figure 17A:
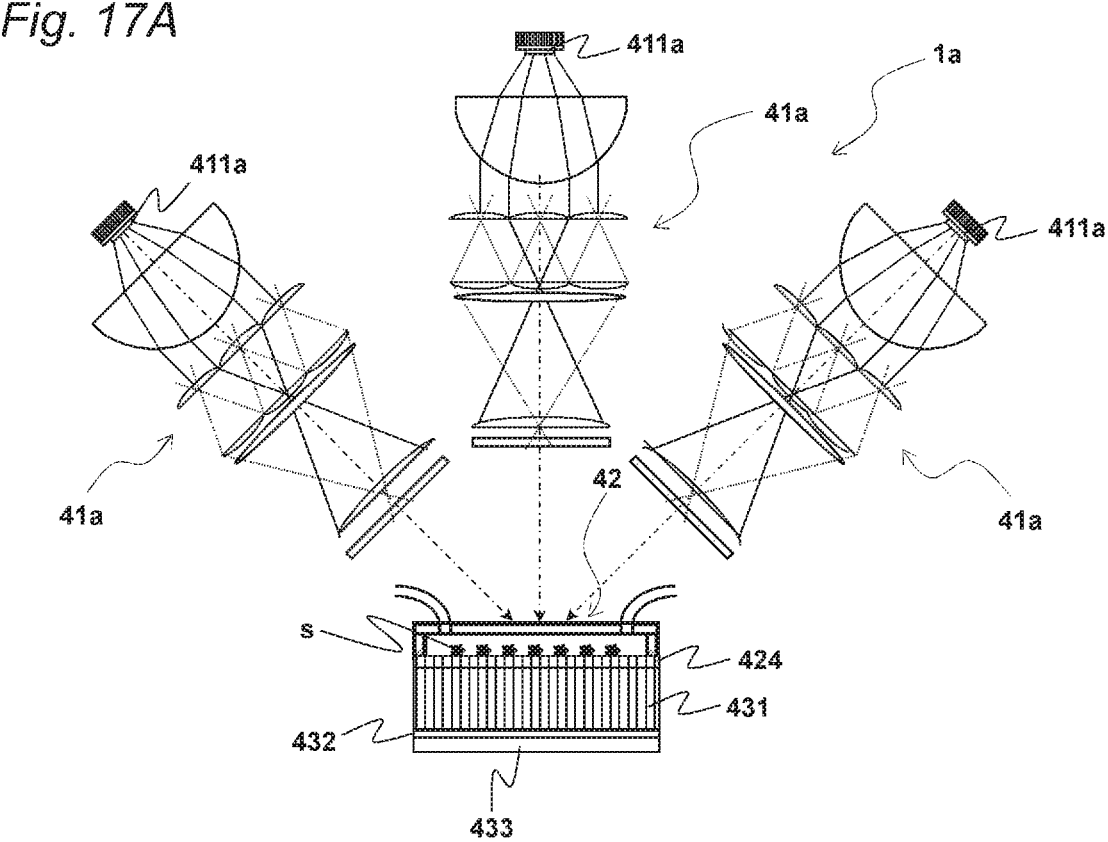
FIGS. 17A and 17B are schematic views illustrating an aspect in which a plurality of sets of irradiation units are used as the irradiation unit of the fluorescence detection section of FIG. 15.
Figure 17B:
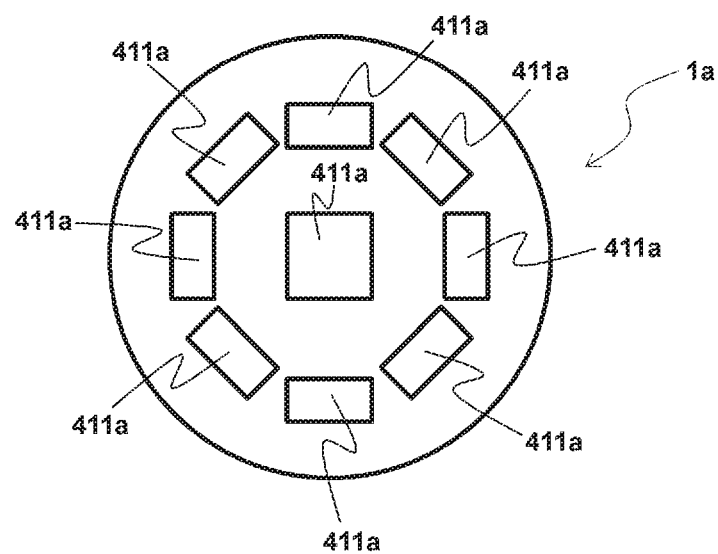
Figure 21:
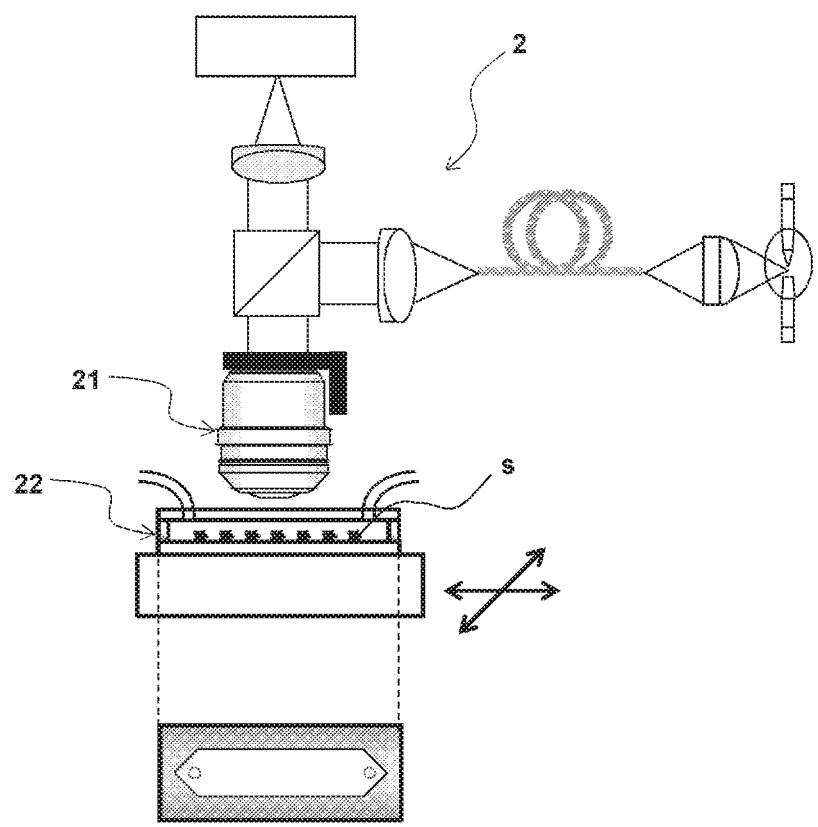
FIG. 21 is a schematic view illustrating an aspect of a fluorescence detection section in a multicolor fluorescence analysis device using an objective lens.

In addition, in the embodiment described above, the multicolor fluorescence analysis device 1 including a set of irradiation units 41 has been described, and a multicolor fluorescence analysis device including a plurality of sets of irradiation units may be used. Specifically, as illustrated in FIGS. 17(a) and 17(b), examples of the device include a multicolor fluorescence analysis device 1a in which nine LEDs 411a, which are a light source, are arranged to form a semispherical surface, nine sets of irradiation units 41a including each of the LEDs 411a described above are arranged, and the excitation light can be emitted to the sample s by the irradiation units 41a. Accordingly, it is possible to increase the intensity of the excitation light emitted to the sample s, and to obtain fluorescent light having a large intensity corresponding to the excitation light (in this example, the intensity increases by 9 times). Furthermore, in the fluorescence analysis device 2 using an objective lens as illustrated in FIG. 21, it is necessary to make the objective lens 21 and the flow chip 22 close to each other by approximately 0.5 mm to 5 mm, and thus, as described above, it is difficult to arrange a plurality of sets of irradiation units.

In addition, in the embodiment described above, the multicolor fluorescence analysis device 1 has been described in which the irradiation unit 41 is disposed in a direction perpendicular to a plate surface of the substrate 423 of the flow chip 42, and a multicolor fluorescence analysis device may be used in which the excitation light is obliquely emitted to the substrate 423 described above, and a set or a plurality of sets of irradiation units are arranged. Specifically, as illustrated in FIGS. 18(a) and 18(b), examples of the device include a multicolor fluorescence analysis device 1b in which eight annular LEDs 411b are arranged, eight sets of irradiation units 41b including each of the LEDs 411b described above are arranged, and the excitation light can be emitted to the substrate 423 by the irradiation units 41b such that the excitation light is incident at a predetermined angle of $\theta_3$.

In the case of using the multicolor fluorescence analysis device 1 as a DNA sequencer as in this embodiment, it is necessary that an incident angle $\theta_1$ of a light ray incident on the first optical fiber 425 configuring the first fiber optic plate 424 satisfies $\theta_1 \leq 30°$. Therefore, the angle $\theta_3$ at which the excitation light is incident on the flow chip 42 is limited to $\theta_3 > 30°$, and thus, it is possible to suppress the total reflection of the excitation light incident on the first optical fiber 425 in the first and second optical fibers 425 and 434, and to reliably detect the fluorescent light.

Such an illumination is referred to as an oblique illumination. The oblique illumination is particularly effective for measuring imperceptible fluorescent light represented by single-molecular fluorescence measurement and the like. In addition, the total number of photons emitted from a single-molecular fluorescent pigment is 104 to 105. On the other hands, in the case of using a known high sensitivity camera as the two-dimensional optical sensor, it is possible to detect the single-molecular described above insofar as a background is sufficiently low and one hundred photons can be received. Therefore, it is known that the number of photons required for the single-molecular fluorescence measurement by using the high sensitivity camera described above is sufficiently ensured in advance, and thus, the required is to reduce the background (background light). In the present invention, the excitation light is the background light. Therefore, according to the multicolor fluorescence analysis device 1b described above, it is possible to eliminate the excitation light, which is the background light, and to reliably detect the fluorescent light.

INDUSTRIAL APPLICABILITY

According to the present invention, it is possible to provide a multicolor fluorescence analysis device in which it is possible to collectively and accurately detect fluorescent light emitted from a plurality of types of fluorescent pigments contained in a sample. Therefore, the multicolor fluorescence analysis device, for example, can be suitably used in base sequence analysis of a DNA using an SBS method in which a plurality of fluorescent pigments are simultaneously used.

REFERENCE SIGNS LIST s sample
1, 1a, 1b multicolor fluorescence analysis device
10 reagent storage section
20 liquid feeding section
30 waste liquid storage section
40 fluorescence detection section
41 irradiation unit
42 flow chip
43 fluorescence detection unit
411 light source
417 second dielectric multilayer film interference filter
417a first filter
417b second filter
417c third filter 417d fourth filter
423 substrate
424 first fiber optic plate
425 first optical fiber
425a first incident portion
425b first exiting portion
426 core portion
427 clad portion
431 second fiber optic plate
432 dielectric multilayer film interference filter (first dielectric multilayer film interference filter)
433 two-dimensional detection unit
434 second optical fiber
434a second incident portion
434b second exiting portion
435 core portion
436 clad portion

The invention claimed is:

1. A multicolor fluorescence analysis device detecting fluorescent light which is emitted from a plurality of types of fluorescent pigments contained in a sample and having different fluorescence wavelengths by being irradiated with excitation light, the device comprising:
   an irradiation unit which sequentially irradiates the sample with a plurality of excitation lights, the excitation lights having different excitation wavelength bands;
   a first fiber optic plate which is in contact with at least a part of the sample, receives light including the fluorescent light emitted from the sample via a first incident portion and guides the light, and allows the light to exit from a first exiting portion on a side opposite to the first incident portion;
   a second fiber optic plate which receives the light exiting from the first exiting portion via a second incident portion and guides the light, and allows the light to exit from a second exiting portion on a side opposite to the second incident portion;
   a single dielectric multilayer film interference filter which is disposed on an end surface of the second exiting portion, and transmits at least a part of the fluorescent light and transmits light having a plurality of transmission wavelength bands not including the plurality of excitation wavelength bands; and
   a two-dimensional detection unit which is disposed to be attached to the dielectric multilayer film interference filter and disposed downstream of the first and second fiber optic plates, and detects light transmitted through the dielectric multilayer film interference filter;
   wherein the dielectric multilayer film interference filter is a first dielectric multilayer film interference filter having a first transmittance ($\alpha_1$) for a first transmission wavelength band that is less than a predetermined value ($\alpha$), and the irradiation unit includes a light source and a second dielectric multilayer film interference filter, having a second transmittance ($\alpha_2$) for a second transmission wavelength band that is less than the predetermined value ($\alpha$), which selectively transmits the excitation lights;
   wherein a first transmission wavelength at a lower end of the first transmission wavelength band and a second transmission wavelength at an upper end of the second transmission wavelength band satisfy a relationship $\lambda_2 \leq \lambda_1 (1-(\sin \theta_{max}/n_{eff})^2)^{1/2}$, such that the first transmission wavelength band and the second transmission wavelength band do not overlap,
   wherein $\lambda_2$ is the second transmission wavelength, $\lambda_1$ is the first transmission wavelength, $\theta_{max}$ is a maximum incident angle of light incident on the first dielectric multilayer film interference filter, and $n_{eff}$ is an effective refractive index of the first dielectric multilayer film interference filter.

2. The multicolor fluorescence analysis device according to claim 1, wherein the predetermined value ($\alpha$) is 0.1%.

3. The multicolor fluorescence analysis device according to claim 1, wherein the effective refractive index ($n_{eff}$) of the first dielectric multilayer film interference filter is greater than or equal to 1.5 and less than or equal to 2.2.

4. The multicolor fluorescence analysis device according to claim 1, wherein the maximum incident angle ($\theta_{max}$) of the light incident on the first dielectric multilayer film interference filter is 30°.

5. The multicolor fluorescence analysis device according to claim 1, wherein an outer diameter of an optical fiber configuring the second fiber optic plate is less than an outer diameter of an optical fiber configuring the first fiber optic plate.

6. The multicolor fluorescence analysis device according to claim 1, wherein the irradiation unit is configured to simultaneously emit at least two of the excitation lights.

7. The multicolor fluorescence analysis device according to claim 1, wherein the plurality of types of fluorescent pigments includes Alexa405, FAM, Texas Red, and Cy5.5.

8. The multicolor fluorescence analysis device according to claim 1,
   wherein the second dielectric multilayer film interference filter includes a first filter, a second filter, a third filter, and a fourth filter,
   a transmittance of the first filter is greater than or equal to 85% in a wavelength band of 380 nm to 396 nm, and is less than 0.1% in a wavelength band other than the wavelength band of 380 nm to 396 nm,
   a transmittance of the second filter is greater than or equal to 85% in a wavelength band of 474 nm to 497 nm, and is less than 0.1% in a wavelength band other than the wavelength band of 474 nm to 497 nm,
   a transmittance of the third filter is greater than or equal to 85% in a wavelength band of 561 nm to 575 nm, and is less than 0.1% in a wavelength band other than the wavelength band of 561 nm to 575 nm,
   a transmittance of the fourth filter is greater than or equal to 85% in a wavelength band of 641 nm to 657 nm, and is less than 0.1% in a wavelength band other than the wavelength band of 641 nm to 657 nm, and
   the first filter, the second filter, the third filter, and the fourth filter are used by being switched.

9. The multicolor fluorescence analysis device according to claim 8, wherein a transmittance of the first dielectric multilayer film interference filter is greater than or equal to 85% in wavelength bands of 436 nm to 462 nm, 536 nm to 548 nm, 620 nm to 632 nm, and 713 nm to 800 nm, and is less than 0.1% in a wavelength band other than the aforementioned wavelength bands.

10. The multicolor fluorescence analysis device according to claim 1, wherein the second dielectric multilayer film interference filter is a single filter, a transmittance of the second dielectric multilayer film interference filter is greater than or equal to 85% in the wavelength bands of 380 nm to 396 nm, 474 nm to 497 nm, 561 nm to 575 nm, and 641 nm to 657 nm, and is less than 0.1% in a wavelength band other than the aforementioned wavelength bands.

11. The multicolor fluorescence analysis device according to claim 1, wherein an end surface of a core portion of an optical fiber in the first fiber optic plate is subjected to an aminosilane treatment, and a surface of the first fiber optic plate on a side which is in contact with the sample, wherein the surface is other than the end surface of the core portion of the optical fiber, is subjected to an HMDS treatment.

\* \* \* \* \*